US008156082B2

(12) United States Patent
Srivastava et al.

(10) Patent No.: US 8,156,082 B2
(45) Date of Patent: Apr. 10, 2012

(54) SYSTEM AND METHODS FOR TEMPORARY DATA MANAGEMENT IN SHARED DISK CLUSTER

(75) Inventors: Ajay Kumar Srivastava, Fremont, CA (US); Raj K. Rathee, San Ramon, CA (US); Yanhong Wang, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 294 days.

(21) Appl. No.: 11/756,925

(22) Filed: Jun. 1, 2007

(65) Prior Publication Data
US 2008/0086480 A1 Apr. 10, 2008

Related U.S. Application Data

(60) Provisional application No. 60/767,586, filed on Oct. 6, 2006.

(51) Int. Cl.
*G06F 17/30* (2006.01)
(52) U.S. Cl. ............. 707/674; 707/609; 714/2; 714/100
(58) Field of Classification Search .................. 714/100
See application file for complete search history.

(56) References Cited

U.S. PATENT DOCUMENTS

| | | | | |
|---|---|---|---|---|
| 5,613,106 A | * | 3/1997 | Thurman et al. .............. | 707/648 |
| 6,185,663 B1 | * | 2/2001 | Burke ............................ | 711/156 |
| 6,202,067 B1 | * | 3/2001 | Blood et al. ..................... | 707/10 |
| 6,266,669 B1 | * | 7/2001 | Brodersen et al. .............. | 707/10 |
| 6,308,178 B1 | * | 10/2001 | Chang et al. ........................... | 1/1 |
| 6,353,836 B1 | * | 3/2002 | Bamford et al. .............. | 707/203 |
| 6,421,688 B1 | * | 7/2002 | Song .............................. | 707/203 |
| 6,564,216 B2 | * | 5/2003 | Waters ................................. | 1/1 |
| 6,604,117 B2 | * | 8/2003 | Lim et al. ....................... | 707/200 |
| 6,643,635 B2 | * | 11/2003 | Nwabueze ............................ | 1/1 |
| 6,748,381 B1 | * | 6/2004 | Chao et al. ............................. | 1/1 |
| 6,801,937 B1 | * | 10/2004 | Novaes et al. ................. | 709/220 |
| 6,859,811 B1 | * | 2/2005 | Chandrasekaran et al. .......... | 1/1 |
| 6,965,936 B1 | * | 11/2005 | Wipfel et al. .................. | 709/224 |
| 6,968,381 B2 | * | 11/2005 | Leymann et al. .............. | 709/226 |
| 7,197,632 B2 | * | 3/2007 | Rao et al. .......................... | 713/1 |
| 7,281,012 B2 | * | 10/2007 | Galchev .......................... | 707/100 |
| 7,403,946 B1 | * | 7/2008 | Taylor .............................. | 707/10 |

(Continued)

OTHER PUBLICATIONS

"Temporary file, Temporary Storage", Microsoft Computer Dictionary, Fifth Edition, 2002, p. 648.*

*Primary Examiner* — Tim T Vo
*Assistant Examiner* — Michelle Owyang
(74) *Attorney, Agent, or Firm* — Sterne, Kessler, Goldstein & Fox P.L.L.C.

(57) ABSTRACT

System and methods for temporary data management in shared disk cluster configurations is described. In one embodiment, a method for managing temporary data storage comprises: creating a global temporary database accessible to all nodes of the cluster on shared storage; creating a local temporary database accessible to only a single node (owner node) of the cluster; providing failure recovery for the global temporary database without providing failure recovery for the local temporary database, so that changes to the global temporary database are transactionally recovered upon failure of a node; binding an application or database login to the local temporary database on the owner node for providing the application with local temporary storage when connected to the owner node; and storing temporary data used by the application or database login in the local temporary database without requiring use of write ahead logging for transactional recovery of the temporary data.

40 Claims, 12 Drawing Sheets

U.S. PATENT DOCUMENTS

| | | | |
|---|---|---|---|
| 7,487,228 B1 * | 2/2009 | Preslan et al. | 709/219 |
| 7,650,338 B2 * | 1/2010 | Grossfeld et al. | 707/999.01 |
| 7,689,862 B1 * | 3/2010 | Bharthulwar et al. | 714/13 |
| 7,739,677 B1 * | 6/2010 | Kekre et al. | 717/168 |
| 2003/0120625 A1 * | 6/2003 | Jackson et al. | 707/1 |
| 2005/0228834 A1 * | 10/2005 | Shinkai | 707/202 |
| 2006/0265358 A1 * | 11/2006 | Hara et al. | 707/3 |

* cited by examiner

SYSTEM AND METHODS FOR TEMPORARY DATA MANAGEMENT IN SHARED DISK CLUSTER

CROSS REFERENCE TO RELATED APPLICATIONS

The present application is related to and claims the benefit of priority of the following commonly-owned, presently-pending provisional application(s): application Ser. No. 60/767,586, filed Oct. 6, 2006, entitled "System and Methods For Temporary Data Management in Shared Disk Cluster", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e):
This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 345820 Bytes, created: 10/06/2006 3:35:48 PM; Object ID: File No. 1; Object Contents: Source code.

BACKGROUND OF INVENTION

1. Field of the Invention

The present invention relates generally to data processing and, more particularly, to temporary data management in shared disk cluster configurations.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Presently, there are three dominant architectures for building multi processor high performance transactional database systems:

Shared Everything (SE)—In this architecture multiple processors of a single computer system share a common central memory and share the same set of disks.

Shared Nothing Cluster (SNC)—In this architecture neither memory nor any peripheral storage is shared among multiple compute systems.

Shared Disk Cluster (SDC)—In this architecture, multiple computer systems, each with a private memory share a common collection of disks. Each computer system in a SDC is also referred to as a Node.

Sybase, for example, offers a database system, known as Sybase® Adaptive Server® Enterprise (ASE), which is based on SE architecture and also referred to as SMP system. A SMP (Symmetric Multi-processing) system is a computer architecture that provides fast performance by making multiple CPUs available to complete individual processes simultaneously (multiprocessing).

Of particular interest herein are distributed SDC environments. In recent years, users have demanded that database systems be continuously available, with no downtime, as they are frequently running applications that are critical to business operations. Shared Disk Cluster systems are distributed database systems introduced to provide the increased reliability and scalability sought by customers. A Shared Disk Cluster database system is a system that has a cluster of two or more database servers having shared access to a database on disk storage. The term "cluster" refers to the fact that these systems involve a plurality of networked server nodes that are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP (symmetric multiprocessor) environments.

Most database servers implement some scheme for managing temporary data, which is often required for storing intermediate results during query processing (e.g., sorting of data) or procedural/application processing. In SMP, temporary data management is provided in the form of temporary tables and temporary databases. Also in SMP, unlike other databases, there is no transactional recovery of a temporary database in the event of failure of the system. At every restart of the SMP system, a temporary database is recreated afresh and all its contents from the previous life cycle of the SMP system are lost. This scheme is not only well suited for managing temporary data but also it allows the SMP system to implement various performance optimization techniques. The most notable performance optimization of all is dispensing with (i.e., not following) the "write ahead logging" protocol for temporary databases. The "write ahead logging" protocol forms the basis of transactional recovery by mandating that all the changes made during a transaction be written to a stable storage before declaring a transaction as complete. By choosing different crash recovery semantics for temporary databases and thus eliminating the need of disk I/Os required for the write ahead logging protocol, a major performance differentiation is achieved for temporary databases.

In ASE, there are three kinds of temporary tables that are stored in a temporary database:

Work tables: These are created internally to store the results of intermediate data generated during a SQL statement. They are automatically destroyed upon completion of the statement.

Temporary tables (also known as #tables): This type of temporary table is created for a session's own use. It cannot be shared across session, and is automatically destroyed when a session ends.

Regular Tables This type of temporary table is typically used to share information between co-operating sessions or applications.

In SMP, each session is assigned a temporary database. Work tables and temporary tables (i.e., #tables) are always created in the assigned temporary database. However, regular tables can be created in any temporary database.

There is much interest in database systems based on SDC architecture. In SDC, for example, a collection of Sybase ASE servers jointly manages all the data on the shared disks, i.e., a single database is used and managed by all the participating ASE servers (instances). When one of the participating instances fails, the database is transactionally recovered and it continues to be available to surviving instances. However, there are significant cost overheads that are involved in maintaining the data coherency and concurrency in SDC. These include costs involved in management of distributed locking schemes, page transfers, inter instance message exchanges, and the like. These costs are justified for a database that needs to be recovered upon an instance failure. However, these costs are not justified for management of temporary data in SDC.

The existing semantics for a temporary database in SMP do not directly fit into SDC systems. Instead, management of tables in a temporary database in SDC should address the following issues:

Upon failure of an instance, work tables and temporary tables that are created by sessions on the failed instance must be destroyed. Work tables and temporary tables that are created by sessions on other instances must continue to be available. Upon failure of an instance, regular tables that are created by sessions on the failed instance (as well other instances) must be transactionally recovered and be available to surviving instances.

The combination of part-recover/part-discard characteristics is not a usual recovery requirement in SDC. Also, this needs to be addressed without incurring the high costs that are usually involved in management of non-temporary data.

Furthermore, in a typical deployment of a SMP system, temporary databases are created on RAM-Disk (a solid state storage disk using random-access memory) to achieve even higher performance. A RAM-Disk is a virtual solid state disk that uses a segment of active computer memory, RAM, as secondary storage, a role typically fulfilled by hard drives. Access times are greatly improved, because RAM is approximately a hundred times faster than hard drives. However, the volatility of RAM means that data will be lost if power is lost, e.g., when the computer is turned off. Since RAM-Disk is not a shared storage, currently, there is no way to use them in SDC. By definition, all the disks in SDC are shared disks, i.e., they can be accessed by all the processors that form the cluster. However, customers would require that they have the ability to make use of RAM-Disk in SDC as well to get same performance benefits as in a SMP system.

Because of the advantages offered by SDC systems, there is much interest in improving performance by solving these problems, including providing a way for a RAM-Disk to be used in SDC.

SUMMARY OF INVENTION

System and methods for temporary data management in shared disk cluster configurations is described. In one embodiment, for example, in a shared disk cluster (SDC) database system comprising a plurality of nodes, a method of the present invention is described for managing storage of temporary data, the method comprises steps of: creating a global temporary database on shared storage, the global temporary database comprising a temporary database accessible to all nodes of the cluster; creating a local temporary database accessible to only a single node (owner node) of the cluster; providing failure recovery for the global temporary database without providing failure recovery for the local temporary database, so that changes to the global temporary database are transactionally recovered upon failure of a node; binding an application or database login to the local temporary database on the owner node for providing the application or database login with local temporary storage when connected to the owner node; and storing temporary data used by the application or database login in the local temporary database without requiring use of write ahead logging for transactional recovery of the temporary data.

In another embodiment, for example, in a shared disk cluster (SDC) database system comprising a plurality of nodes, a system for managing storage of temporary data is described that comprises: a global temporary database on shared storage, the global temporary database comprising a temporary database accessible to all nodes of the cluster; a local temporary database accessible to only a single node (owner node) of the cluster and providing storage for temporary data on the owner node; a module for providing failure recovery for the global temporary database without providing failure recovery for the local temporary database, so that changes to the global temporary database may be transactionally recovered upon failure of a node; and an application or database login which is bound to the local temporary database on the owner node and when connected to the owner node uses the local temporary database for storing temporary data without use of write ahead logging for transactional recovery of the temporary data.

DETAILED DESCRIPTION

Glossary

Figure 1:
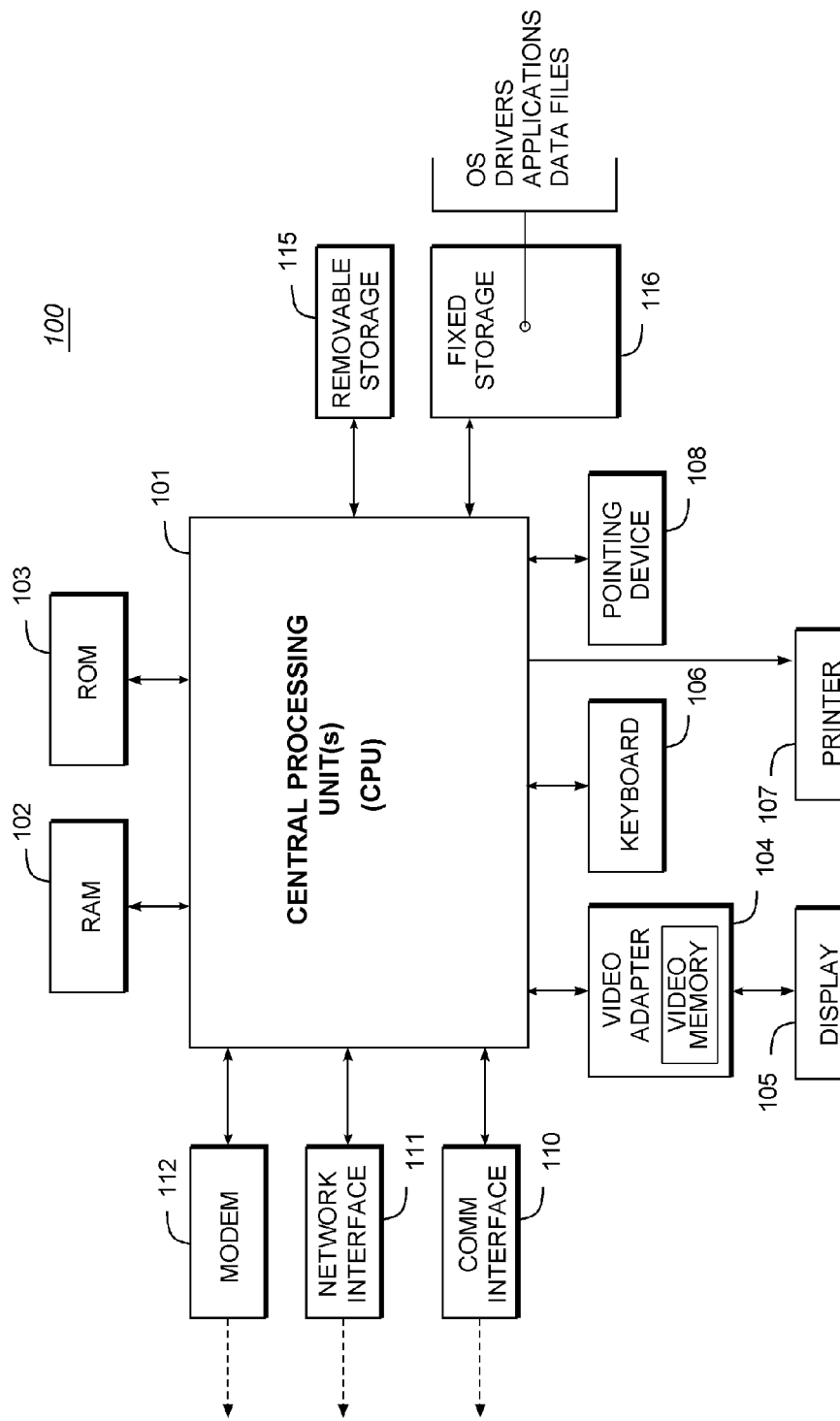
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

ASE: Sybase® Adaptive Server® Enterprise, an enterprise relational database system available from Sybase, Inc. of Dublin, Calif.

Node (instance): Refers to an instance of ASE server running on a host computer or an equivalent, as part of a cluster of similar servers running on the same/other computers.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SDC: SDC stands for Shared Disk Cluster, which is a system that has a cluster of two or more database servers having shared access to a database on disk storage.

SMP: Symmetric Multi-processing (SMP) is a computer architecture that provides fast performance by making multiple CPUs available to complete individual processes simultaneously (multiprocessing). Unlike asymmetrical processing, any idle processor can be assigned any task, and additional CPUs can be added to improve performance and handle increased loads.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Client-Server Database Management System

Figure 2:
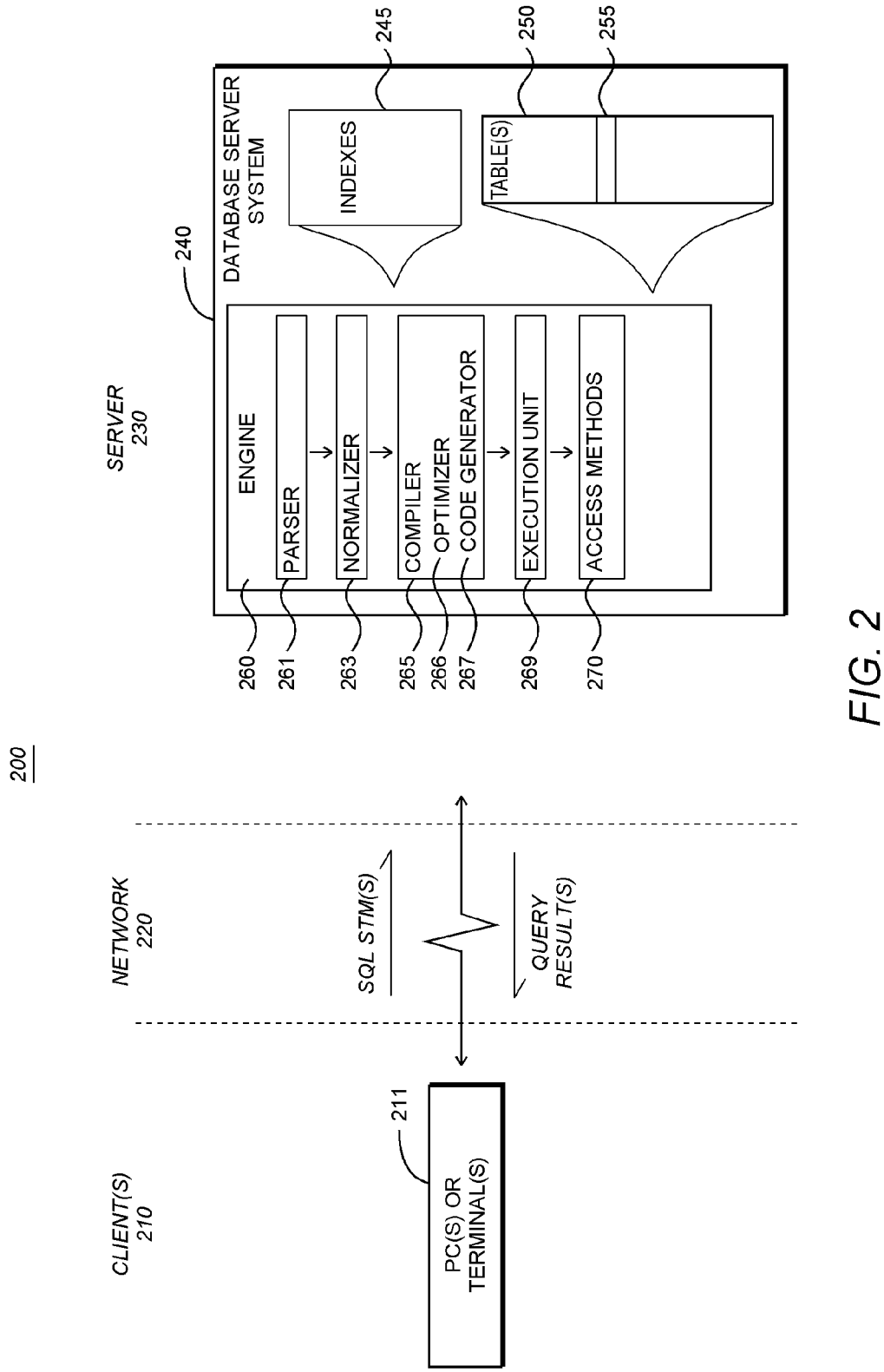
FIG. 2 is a block diagram illustrating the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, Windows XP, Windows Vista).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. For purposes of the description that follows, it will be assumed that the database page size is 2 k, although it can be one of 2 k, 4 k, 8 k and 16 k. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record, which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying computer components (e.g., database server) that may be employed for implementing the present invention. For purposes of discussion, the following description will present examples in which it will be assumed that there exists a "server" (e.g., database server) for purposes of implementing the processes described below. In typical operation, such a server communicates with one or more other computers, including "clients" (e.g., customer or end-user computers that are "database clients" of the server). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

A. Existing Temporary Database (Tempdb) Support

In order to understand construction and operation of the present invention, it is first instructive to review the multiple tempdb feature as it exists before the new SDC functionality provided by the present invention. The multiple tempdb feature provides users the ability to create databases that can be designated as temporary databases, which can then be used for the creation of temporary objects. DBAs can bind logins and applications to specific temporary databases or to a group of temporary databases via a stored procedure interface.

At login time, sessions get assigned to a temporary database, based on the existing bindings in effect. If the binding is to a specific temporary database and that database is available (online), then the session gets assigned to it. If the binding is to a group (which constitutes a set of temporary databases), then a temporary database from that group is selected using a round robin selection policy. The specified group can be the default group.

If no binding is specified then a temporary database is selected from the default group. The temporary database chosen for a session remains in effect for the duration of that session and never gets changed, regardless of any changes to the bindings specified in "sysattributes" (system attributes table). Once a session is assigned a temporary database, all temporary objects created during that session will be created in that temporary database. These objects will be implicitly dropped when the session or server exits. Note that temporary tables may be dropped explicitly by the session. Users created temporary databases (UC tempdbs) are very similar to the system tempdb in that they are primarily used for the creation of temporary objects, and that they are not recovered at recovery time. All objects that existed in a temporary database before shutdown (or a crash) are lost on recovery since temporary databases are simply overwritten with the model database. Certain restrictions that currently apply to the system temporary database also apply to the user created temporary databases. Unlike the system temporary database, user created temporary databases can be dropped.

Stored procedures that create or access session/nonshareable temporary tables do so in the temporary database assigned to the session in whose context the stored procedure is executed. Importantly, server/shareable temporary tables will continue to be created in the system tempdb if they are fully qualified as "tempdb..server_temptab". This is done to ensure that existing applications that pass information between sessions using shareable temp tables will continue to work. Note that applications are able to create shareable temp tables in user-created tempdbs. These work identically to shareable temp tables created in the system tempdb. Cooperating processes are able to communicate through these tables. However, unlike the system tempdb, UC tempdbs can be dropped. It is important to note that any applications that are dependent upon a UC tempdb that is dropped will break.

B. Multiple Tempdb Support in SDC

Multiple tempdb support in SDC changes from previous support in a number of very significant ways. These changes and the motivation behind them are outlined in this section. As the SDC name implies, nodes in a SDC share the same disk resources, such that all regular user databases are accessible from all nodes in the SDC. This means that such shared disk resources need to reside on (relatively expensive) SANs (storage area networks), or similar hardware infrastructures. Such devices not only can be expensive but access to the data on these will definitely be slower than access to data stored on RAM devices (temporary filesystems). ASE customers are used to creating temporary databases on RAM Devices since these devices are fast and since data on such devices need not be recovered during server boot. Customers would of course like to continue to see the fast and efficient access to their temporary data that they are used to. To enable this, SDC users can now create private devices. A private device is a device that has a logical attribute (private) to indicate that only one node within a cluster has access to the device. The owning node of a private device is stored in sysdevices (system devices). Note that the private attribute is a logical attribute. The device may or may not be physically accessible by other nodes in the cluster. However, non-owner nodes (nodes other than the one that owns the private device) do not access the device. The temporary databases are now of two types: global temporary databases and local temporary databases.

A global temporary database is accessible by all nodes in the cluster and cannot be created on a private device. It is used for creation of shareable tables and is not used for the creation of non-shareable temporary tables or work tables (the system tempdb is a special case that can be used for both purposes but only during initial configuration as explained later in this document). The existing system tempdb (with dbid 2) is a global temporary database and users have the ability to create other global temporary databases.

A global temporary database is recreated using a model (i.e., database model) during cluster boot. At all other times it behaves exactly as any regular user database. That is to say that if any nodes were to go down, the global temporary database would be recovered like any other regular user database. A local temporary database on the other hand can only be accessed by the owner node in a cluster. The owner node is defined by way of a new column in "sysdatabases." A local temporary database is used for creation of all non-shareable temporary objects (#tables, work tables and fake tables). A local temporary database can be created on either a shared device or a private device or both. An exception to this is local system temporary databases which must always be created on shared devices. A local temporary database gets recreated when its owning node boots up and joins a cluster.

As part of configuration of a cluster the user creates local system temporary databases. Each node has its own local system temporary database and this information is stored in "sysdatabases" (system databases). The local system temporary database for each node is its default local temporary database. If the user has not created other local temporary databases for this node then all non-shareable temporary objects created on that node will use this default local temporary database.

Note that these local system temporary databases are user created (or via the Sybase provided syb_cluster utility) even though these are treated as system databases. This work is done as part of the initial configuration of the cluster, or when adding a node to the cluster at a later point in time. Note that when a node comes up for the first time in a SDC environment these local system temporary databases will not exist. Hence this node will get assigned the system tempdb (dbid 2) as its default local temporary database. A user will then need to create the necessary local system temporary databases, shutdown and reboot. Another node cannot join the cluster as long as some node in the cluster has the system tempdb as its default local temporary database. On subsequent reboot each booting node will find its local system temporary database from sysdatabases (system databases) and use that as its default local temporary database.

Local system temporary databases can only be created on shared devices. This is necessary to allow dropping of these databases from nodes other than the owning node (as well as allowing them to be created from another node as part of the initial configuration of a node). Users have the ability to create additional local temporary databases. Each local temporary database is owned by a node and this ownership information is stored in sysdatabases. Applications and logins can effectively be bound to local temporary databases similar to previous multiple tempdb functionality, or to tempdb groups (which are fully supported).

Temporary Data Management in Shared Disk Cluster

In SNC (Share Nothing Cluster), a single database is partitioned among the instances running on the nodes of multi-computer system. Each instance or node manages a distinct subset of data and all access to this data is exclusively performed by this "owing" instance. In a pure SDC architecture, a database is logically shared among the nodes of a loosely coupled system. Each node has access to the entire database. To ensure that the temporary data management scheme in SDC continues to provide same high performance benefits as in SMP, a unique system for managing temporary data in SDC is provided by the present invention by combining the basic concepts of Shared Nothing Cluster Architecture into the Shared Disk Cluster. This new scheme retains all the performance benefits of temporary database management as available in SMP and it also allows use of a RAM-Disk in SDC. The present invention introduces the following new concepts and constructs in SDC: Private Device, Global Temporary Database, and Local Temporary Database. These will be discussed in greater detail in turn.

Private Device

In a pure SDC architecture, data is stored in shared disks (also referred to as shared devices). A shared disk is accessible to all the nodes in the cluster. In accordance with the present invention, a new concept of private device is introduced. A private device is a device that has a logical attribute private to indicate that only one node within a cluster has access to the device. The node that can access the private device is referred to as the owner node (or device owner). The device itself may or may not be physically accessible to other nodes in the cluster.

By declaring a device as private and restricting its access to a single node, disks that are physically accessible to only one node can also be used in SDC. Finding a use for not-shared storage (i.e., private disks) is a significant extension to the SDC architecture. The present invention makes use of such private disks/device to efficiently manage temporary data within a cluster.

Global Temporary Database

A global temporary database is a temporary database that is accessible from all nodes of the cluster and is used for creating only regular tables in it. The temporary tables (#tables) and work tables cannot be created in it. Since it needs to be accessed from all the nodes of the cluster; it can only be created on the shared storage/devices.

Unlike a temporary database in SMP, this database follows the write ahead logging protocol and thus ensures that tables that are created in it by one node are accessible to other nodes in the cluster. Also, when a cluster node fails, changes made in the global temporary database are transactionally recovered so that surviving nodes still have access to the data created in it by the failed node. In essence, semantics and performance characteristics of a global temporary database are the same as any regular database in SDC except during the restart of the cluster. At the restart of the cluster, a global temporary database is recreated and all its contents from its previous life cycle are lost. This is in-line with semantics of regular tables in a temporary database in SMP. Note that regular tables in a temporary database constitute only a minor fraction of overall temporary data that is typically created.

Local Temporary Database

In typical customer applications, the majority of the temporary data is created in the form of work tables or temporary tables. To ensure that this temporary data is managed in the most efficient way possible in SDC, the present invention introduces the concept of a local temporary database. A local temporary database is a temporary database that can be accessed only by one node in the cluster. The node that has access to it is termed as the owner node. The temporary data that is created in it by the owner node cannot be accessed by any other node in the cluster. Upon failure of a node, local temporary databases that are owned by the failed node are not transactionally recovered. Note that it (failure of the owner node) does not cause any impact to other surviving nodes, as they could not access that database anyway. When the failed node is rebooted to join the cluster, local temporary databases that are owned by it are recreated afresh (i.e., all the temporary data in them from their previous life cycle is discarded). These semantics work very well with the scope and life of temporary tables and work tables.

Since there is no transactional failover recovery or crash recovery required for a local temporary database, there is no need to follow the write ahead logging protocol for it. This results in substantial benefit of reduced I/Os which are usually required if a database were to be recovered. Though there is no crash/failover recovery support for a local tempdb, it continues to provide for complete transaction recovery at runtime. This scheme delivers the same set of optimizations for tempdb in SDC, which are available for it in SMP. Also, since each node uses only its local temporary database, the need for synchronization of data and meta-data (control structures of a database) among all the cluster nodes for a local temporary database is completely eliminated. Typically, synchronization of such data in SDC is achieved by maintaining cluster wide locks (both transaction locks and page locks), transferring pages from one node to another and transfer of other necessary messages. The cost of this inter-node synchronization is very high and usually considered as the price that one has to pay to get the high availability benefits from SDC. However, the approach of the present invention completely eliminates these costs for managing temporary data in SDC.

Since a local temporary database is only accessed by one node, it is also well suited to use the newly introduced private devices. A local temporary database can be created on a RAM-Disk which is declared as a private device. By enabling use of RAM-Disk for temporary database in SDC, much greater performance is achieved with respect to management of temporary data in SDC. Further, by allowing each node to have as many local temporary databases as required for each node and by continuing to provide the mechanism that allows database logins and applications to be bound to a certain local temporary database or to a group of local temporary databases, it enables real life applications to greatly benefit by implementing appropriate application resource partitioning and load management. Each application and login connection (i.e., session) to the cluster is assigned a local temporary database based on the available bindings for the node where the requested connection is established.

Internal Architecture

Figure 3:
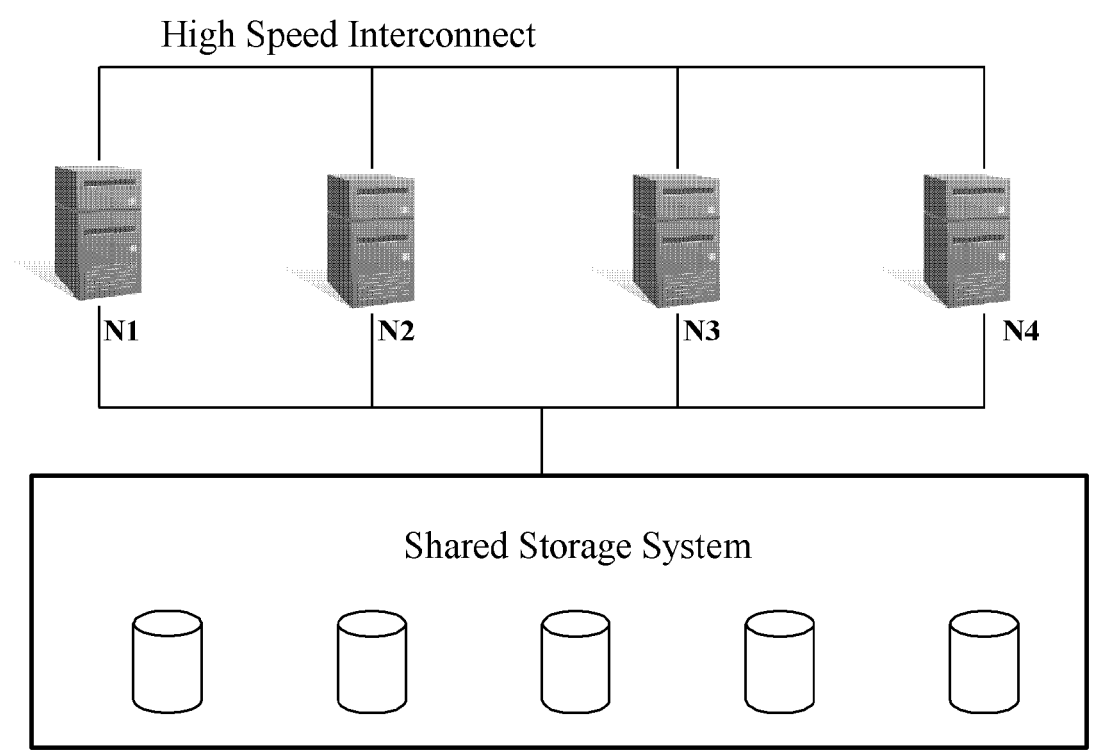
FIG. 3 is a block diagram illustrating the typical setup for a pure SDC with four nodes connected via high speed interconnect.

In a pure SDC architecture, a cluster comprises of processor nodes, cluster interconnect and shared storage system. All the databases are created in the shared storage. FIG. 3 is a block diagram illustrating the typical setup for a pure SDC with four nodes (N1, N2, N3 and N4) connected via high speed interconnect. Also, all the nodes have access to the shared storage system where all the databases are created.

Figure 4:
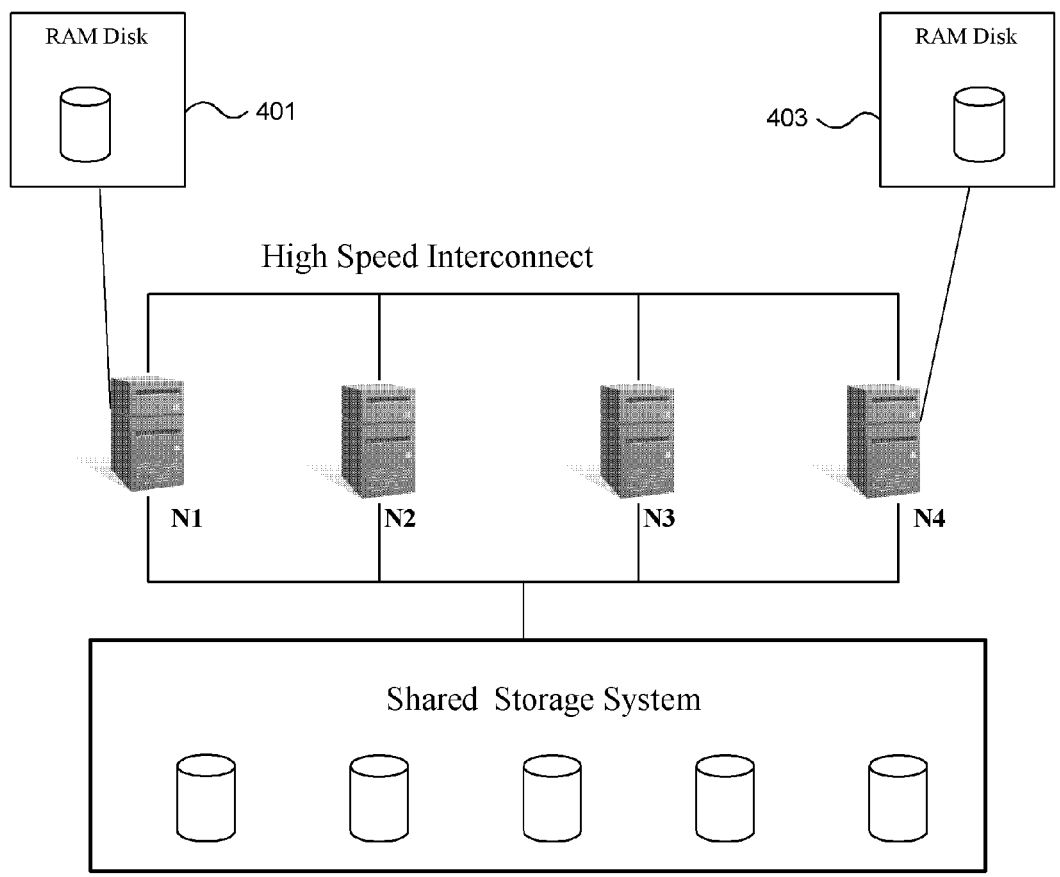
FIG. 4 is a block diagram illustrating the use of local temporary databases on RAM disks.

The present invention allows for use for private disks/devices and creation and use of node specific local temporary databases in them to efficiently manage temporary database in SDC. FIG. 4 is a block diagram illustrating the use of local temporary databases on RAM disks. Here node N1 and N4 each has access to its own RAM-Disks, that is, disks 401, 403 respectively. In each of those disks, a local temporary database is created that can be exclusively used by its respective node. Node N2 and N3 do not have access to any private device and thus they can have their local temporary databases in shared storage.

Figure 5:
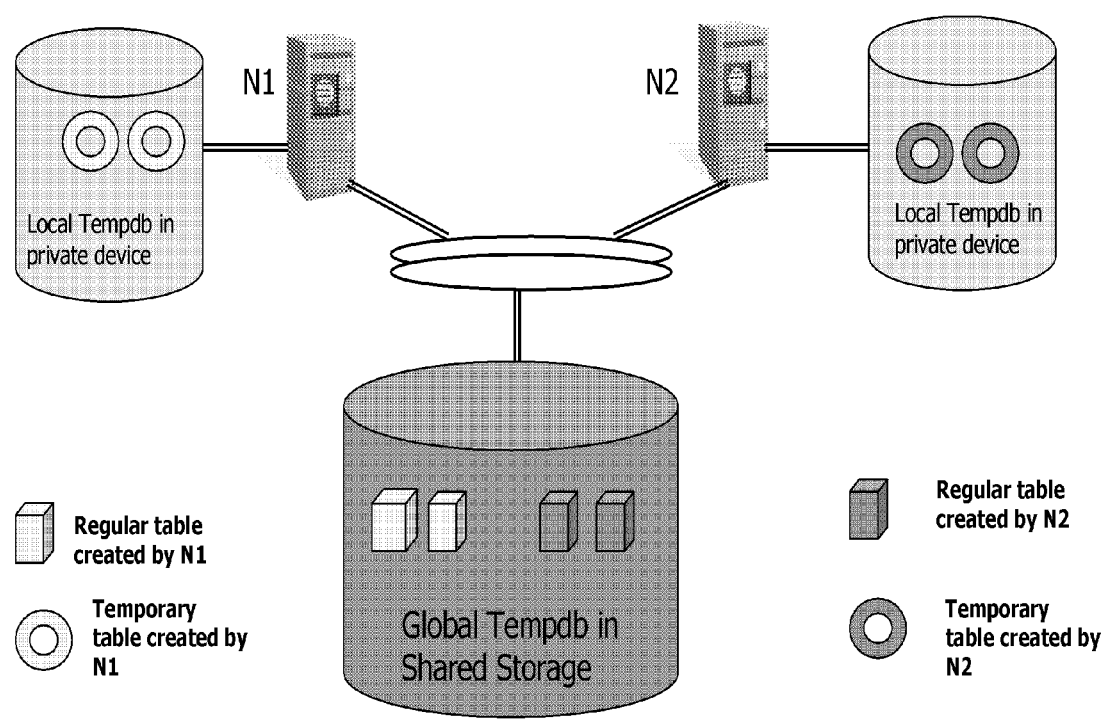
FIG. 5 is a block diagram illustrating the use of local and global temporary database in two node SD cluster.

FIG. 5 is a block diagram illustrating the use of local and global temporary databases in a two-node SD cluster. Nodes N1 and N2 are connected via high speed interconnect. Both nodes share a global temporary database that exists on shared storage. Also shown are the local temporary databases on private devices for node N1 and N2. Note that accessing data in the global temporary database may need the act of acquiring cluster wide locks and transferring involved pages from one node to another via high speed interconnect. However, while accessing data from a local temporary database, these additional costs are not incurred, thus resulting in greater performance benefits.

Figure 6:
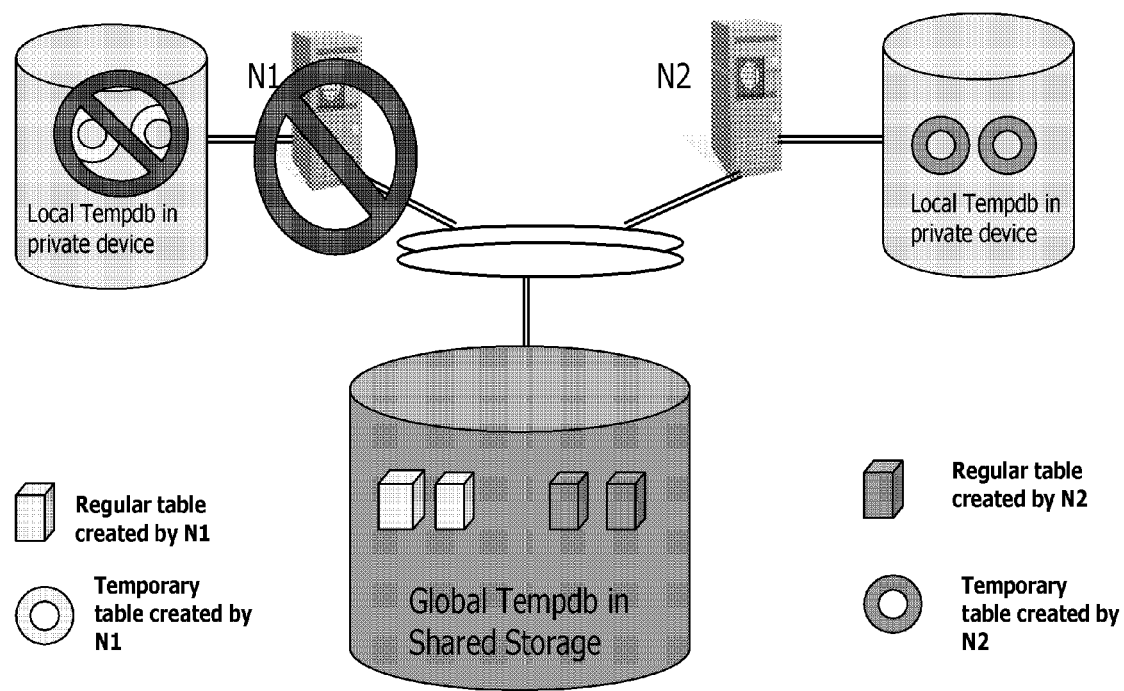
FIG. 6 is a block diagram illustrating the scenario when one of the cluster node (N) fails.

FIG. 6 is a block diagram illustrating the scenario when one of the cluster node (N1) fails. Note that, after failure of N1, there is no need to recover its local temporary database and all its contents can be discarded. Since ensuring recovery of data entails higher disk I/O cost during run time, such I/O costs are reduced to minimum for local temporary databases. When the failed node comes back online again, all its local temporary databases are recreated afresh. Note that discarding contents of a local temporary database of failed node N1 does not have any impact on the surviving node N2. Node N2 continues to use its local temporary database.

The present invention when employed in the current SDC design benefits a wide variety of applications in various deployment scenarios. Efficiencies delivered by the new scheme in the management of temporary data in the cluster help improve the overall query processing performance. It also delivers a great cost advantage by allowing private disks (instead of very expensive SAN disks) to be used for storing temporary data in SDC.

Interface

The following describes the changes/additions to external interfaces available to the DBA to manage temporary databases.

A. Private Device Management

Creation of Private Device

A private device is created via the disk init command. A private logical attribute indicates that a device is private. It implies that only one node in a SDC has access to the device. While it may be true that a device is physically accessible from other nodes, ASE has no way of determining this information other than to try to access the device. This logical attribute is a means by which an administrator indicates that a device is private to a node, and that node is stored in sysdevices. A node can own any number of private devices.

The new syntax for disk init is as follows.

```
disk init
    name = "device name",
    physname = "physicalname",
    vdevno = virtual_device_number,
    size = number_of_blocks,
    [, vstart = virtual_address,
    cntrltype = controller_number ]
    [,contigous]
    [, instance = <instance_name>]
```

A private device is indicated by a status bit DSK_PRIVATE in sysdevices status field devstat2. The owning node for a private device is stored in a new column, "instanceid", in sysdevices. When creating a private device, the disk init command is required to be executed at the node that will own the device. To do this, ASE internally ships the command to the instance specified by the user. The end user need not be logged into the node for which the device is being created, but the node needs to be up and running to process the disk init command.

Note that the creation of a device results in creation of data structures to keep track of the device info. For private devices, only the owning node will have such structures. Other nodes will not be aware of this device (save for the information stored in sysdevices). A private device cannot be used for default storage (e.g., for the creation of a database where the on clause and log on clause are not used). Existing stored procedure sp_diskdefault cannot be used on a private device. No provision is made for transferring ownership of a private device from one node to another. In such a case the device would have to be dropped and recreated. No provision is made for switching off the private logical attribute of private devices.

Disk Mirroring

Disk mirroring is not allowed on private devices. In the currently preferred embodiment, private devices are only used for the purposes of creation of the local temporary databases. As such, disk mirroring is deemed unuseful for private devices. Commands disk mirror, disk remirror and disk unmirror will return an error message when invoked on a private device to indicate that disk mirroring related operations are not allowed on private devices.

Command: Disk Refit, Disk Reinit

Command disk refit rebuilds the master database's "sysusages" and "sysdatabases" system tables from information contained in sysdevices. Command disk reinit rebuilds the master databases' sysdevices system table. These commands require access to the information contained in all of the devices including private devices.

Stored Procedure: sp_helpdevice

The stored procedure sp_helpdevice reports information on devices. This will report if a device is private or not, and if private, it will also report the owning node.

Dropping a Private Device

Devices are dropped using the existing stored procedure sp_dropdevice. A private device is required to be dropped from the owning node. The end user, however, can execute the command from any node. Note that devices cannot be dropped if they are in use by a database. The current embodiment supports creation of local temporary databases on private devices. Thus, the user will be required to first drop any temporary databases on the device being dropped, and then rerun sp_dropdevice.

B. Local System Tempdbs

Each node in a cluster needs its own local temporary database space. This temporary database space comes in the form of local temporary databases. A node can have one or more local temporary databases. A local temporary database can belong to only one node. Apart from the fact that temporary databases can be created on private devices which are inaccessible from other nodes, this one-to-many relationship between a node and local temporary databases is necessary because when a node goes down and comes back up again one can readily recreate its local temporary databases from a model (model database). If a local temporary database were to be shared between nodes, then if a node were to go down one would have to recover the space used by the temporary objects created from the sessions on the node going down. Recovery would have to be overhauled to do this.

Each node is, therefore, provided private temporary database space via local system temporary databases as well as local temporary databases. A local system temporary database is a necessary requirement for each node and serves as the default local temporary database space. Each node has only one such local system temporary database. Other user created local temporary databases can be created as desired. In the absence of any other local temporary database assigned to a node, the default local temporary database serves as the only place where a session running on the node can create its non-shareable temporary tables and work tables.

In the currently preferred embodiment, there should be as many local system temporary databases as there are nodes configured in the cluster. A node cannot successfully join a cluster if it does not have a local system temporary database for its exclusive use. Thus, it is required that the local system temporary databases are created on shared storage. This allows configuration of new nodes from any node in the cluster (which includes creation of these databases), as well as dropping of these databases from any node (in the case where a node is being removed from the SDC).

Syntax

The "create temporary database" command is used to create a local system temporary database. The syntax is as follows:

```
CREATE [ [globa l system] TEMPORARY] DATABASE <dbname>
[for instance <instance_name>]
[on {default | database_device} [= size]
    [, database_device [= size]]...]
[log on database_device [= size]
    [, database_device [= size]]...]
[with {override | default_location = "pathname"}]
[for {load | proxy_update}]
```

The default behavior of "create temporary database" is that it will create local user tempdb, i.e., CREATE TEMPORARY DATABASE <dbname> for instance <instance_name> will create local user tempdb for the specified instance. If "global" is specified, i.e., CREATE GLOBAL TEMPORARY DATABASE <dbname> will create global user tempdb; if "system" is specified, i.e., CREATE SYSTEM TEMPORARY DATABASE <dbname> for instance <instance_name> will create local system tempdb for the specified instance. For example: create system temporary database tdb1 for instance node1 on default=50

Creation of a Local System Temporary Database

A node needs to have a local temporary database available during boot up time since internal queries and the like may need temporary database space. Therefore, a mechanism needs to exist to bootstrap the cluster with the required local system temporary databases. This work is done by the user during the configuration of the server and proceeds as follows. The first time a node comes up in a cluster, there will be no local system temporary database created for it. In this case the node will assign the system tempdb (dbid of 2) as its default local temporary database and the server will continue to function with the system tempdb taking on the roles of a local temporary database as well as global temporary database (as was the case in an SMP environment).

However, in such a state, where the system tempdb is also used as a local temporary database, no other node can come up in the cluster. This is a configuration state where the user is expected to create the required local system temporary databases (one for each node being configured in the SDC). The sysdatabases entry for these databases will contain the owning node id for the node to which each belongs in the new column, "instanceid". Once the user has created the required number of local system temporary databases, a cluster shutdown (in this case, the single node that is up and running) is necessary. A second node cannot come up if the first node is using system tempdb as a local temporary database. Note that creation of such databases need not be a user visible activity. It may be done as part of the syb_cluster utility as part of configuration of nodes in the cluster. The end user may be blissfully unaware of what steps are involved in this setup.

On reboot of the cluster, the first node to come up will find its local system temporary database from sysdatabases, and assign it as its default local temporary database. After that point only nodes that have a local system temporary database (in sysdatabases) can come up and join the cluster. If the first node to come up does not find its local system temporary database then it will assign the system tempdb (dbid of 2) as its default local temporary database, and no more nodes can join the cluster at that point. That is to say that the cluster again enters the configuration state.

In the case of a node that does not have a local system temporary database created for it and tries to boot up, and there already exists an active node in the cluster (either in configuration state or otherwise), the node will fail to boot. If the booting node is the first one to come up and does not find its local system temporary database, then it will enter into the configuration state. Local system temporary databases are created via the "create temporary database" command by specifying the database as a system database and providing the owning instance name.

The local system status of this temporary database is indicated by the bit value 0x20000000 (536870912 decimal) in the "status3" field of sysdatabases. This gets set during the creation of the database. In addition to all options inherited from the model, a local system temporary database, like the system tempdb, has the following database options set:
select into/bulkcopy
trunc log on chkpt Furthermore, as with system tempdb, the guest user is added to the temporary database and "CREATE TABLE" permission is granted to PUBLIC.

Unused pages are not cleared on creation of the local system temporary database, since a local system temporary database is recreated every time on recovery. Sizes of these local system temporary databases should be consistent across the collection of local system temporary databases since any application can be assigned to any of these temporary databases. However, this is a guideline only and is not enforced by the server.

Post Creation

After creation of the initial local system temporary databases, the cluster will need to be shutdown and rebooted, since the active assignment of the system tempdb to the first node will prevent any other node from joining the cluster. At reboot time, the first node coming up reads sysdatabases to find its local system temporary database. If it finds the database, it assigns that database as its default temporary database. At that point any subsequent node that tries to join the cluster but does not find its local system temporary database will fail to boot (join the cluster), and an error message will be reported. If the first node to come up does not find its local system temporary database, it enters the configuration state by assigning system tempdb (dbid 2) as its default temporary database. At this point no other nodes can join the cluster. The user can create any necessary local system temporary databases and will then need to reboot the cluster.

Once a node finds its local system temporary database, it proceeds to recreate the database as normal by copying over the model database and other activities associated with temporary database recreation. Note that each node is responsible for recreating its local system temporary database. A local system temporary database can be extended as required using alter database, but only on shared devices. Note that unlike in SMP where the system tempdb was part of the default group, in SDC the local system temporary databases are not added to the default group. This way they are assigned to sessions only as a last resort (when default group is empty), and no other binding/assignment has been defined.

Dropping Local System Temporary Databases

Normally, a local system temporary database is always in use when its owner instance is up (in operation). Thus, the local temporary database cannot be dropped as long as its owner instance is up. For this reason, a local system temporary database for a node is typically dropped from some other node in the cluster when the owner node is down. However, when its owner instance is the only instance in the cluster, then the present invention provides for marking a local system temporary database for drop using a new sp_tempdb_markdrop stored procedure. After a node's local system temporary database is marked for drop, the node is shutdown and then restarted. This time node will not use its local system temporary database as it is marked for drop. Now, the existing drop database command can be issued to drop this local system temporary database from this node itself. Although the use of this procedure is primarily intended for dropping the local system temporary database of the last instance in the cluster, it can also be used even when more than one instance is running in the cluster.

The syntax for the new stored procedure sp_tempdb_markdrop is as follows:
Usage: sp_tempdb_markdrop dbname [, {'mark' | 'unmark'}]
  mark'—marks given local system temporary database for drop.
  unmark'—clears the drop mark for given local system temporary database.
If no action is specified, then its default action is 'mark'.

C. User-Created Local Tempdbs

Users have the ability to create additional local temporary databases. These local temporary databases are node specific and can be assigned to sessions logging into the owning node. These databases are also (like the local system temporary databases) used for non-shareable temporary objects and work tables. They cannot be used for regular shareable tables. These are similar to local system temporary databases and serve the same purpose. Whereas the local system temporary databases are necessary for cluster configuration in order to provide the default local temporary space, these additional databases are optional and are a way for the user to create more temporary space and allow login and application bindings (similar to what was provided in the original multiple tempdb functionality). Whereas local system temporary databases cannot be created on private devices these regular local tempdbs can be created on private or shared storage (or both). While the user is free to size the databases as desired (within known constraints such as it cannot be smaller than the model) it is recommended that the databases are sized similarly since an SDC provides a single system image to an application (implying that an application may log in at any node in the SDC, and one would want to ensure that its temporary space requirements are met regardless of what node it executes on).

Syntax

The "create temporary database" command is used to create a local temporary database. Its syntax is as follows:

```
CREATE [ [globa l system] TEMPORARY] DATABASE <dbname>
  [for instance <instance_name>]
  [on {default | database_device} [= size]
     [, database_device [= size]]...]
     [log on database_device [= size]
     [, database_device [= size]]...]
  [with {override | default_location = "pathname"}]
  [for {load | proxy_update}]
```

For example:
create temporary database for instance node1 node1tempdb1 on privdev1=50

Creation of Local Tempdbs

Local temporary databases are created via the "create temporary database" command. If 'for instance' clause is not used when creating a local user temporary database, then local user temporary database is created for the node where this command executes. The local temporary status of a database is indicated by value 0x00000100 (256 decimal) in the "status3" field of a sysdatabases entry. This gets set during the creation of a local temporary database. In addition to all options inherited from the model, a local temporary database, like the system tempdb, has the following database options set:

select into/bulkcopy
trunc log on chkpt

Furthermore, as with system tempdb, the guest user is added to the local temporary database, and "CREATE TABLE" permission is granted to PUBLIC. Unused pages are not cleared on creation of the local temporary database, since a temporary database is recreated every time on recovery.

The database can be created from any node in the cluster. ASE will internally ship the creation command to the owning node specified in the create temporary database command. The owning node of a local temporary database is stored in new sysdatabases column, "instanceid". Devices specified via the "create temporary database" command for a local temporary database can be shared as well as private devices. If no device is specified, then the database will be created on a shared device (i.e., from the default storage space).

Post Creation

The local temporary database gets added to the owning node's global list of available temporary databases. This list is global to the node and not global across the cluster. If the list is already full, then the database does not get added to the list. This does not affect the create database work. Only one node can be the owner of a local temporary database. A node can own zero or more local temporary databases.

A database not registered in the global list cannot be assigned to a session. In essence, this list serves as a repository of all available (online) local temporary databases owned by the node. This list is used to determine if a local temporary database can be assigned to login and/or application, as well as to determine if a database can be added to a group. If the temporary database is not added to the global list (e.g., when full), the database is not available for assignment to a session. An attempt to bind to this database will fail.

D. Global Temporary Databases

Global temporary databases are databases that are accessible from all nodes within the cluster. These are used for the creation of shareable temporary objects, and cannot be used for the creation of non-shareable temporary objects (except for the special case, discussed later). The motivation behind having global temporary databases is to have temporary workspace that outlasts a node crash where other nodes are still active in the cluster. Shareable tables need to continue to exist and be accessible from other nodes in the cluster in such a scenario. Global temporary databases are recreated at cluster boot time by the first node in the cluster. Creation of non-shareable objects is not allowed in a global temporary database to avoid making drastic changes in recovery of a temporary database when a node on which a session has created such tables goes down. To keep recovery issues simple, only local temporary databases can be used for such non-shareable objects. The only exception to the above is at configuration time of a cluster (when the first booting node in the cluster does not find its local system temporary database), in which case the system tempdb also serves the dual role of a local temporary database as well as a global temporary database.

For all practical purposes, a global temporary database is identical to a regular user database except that a global temporary database is recreated afresh at cluster boot time. At all other times (logging, log flushing, I/O behavior, run-time rollback including from a node failure within the SDC) it is identical to a regular user database. Any temporary database specific optimizations that were done under SMP no longer apply to global temporary databases.

The system tempdb is the global temporary database that is always a part of the system. Users have the ability to create more global temporary databases if desired. The primary motivation for allowing this is that (post multiple tempdbs of ASE 12.5.0.3) some applications might create sharable tables in user created temporary databases. To allow such applications to continue to work seamlessly, the user can create a global temporary database with the same name as the user created temporary database; the application will continue to work, and the table it creates will still be temporary and will not survive cluster reboot. Note that the system tempdb in SDC must be on shared storage as it is a global temporary database.

Creation of Global Temporary Database

Creation of a global temporary database is identical to creation of user temporary databases as it existed in SMP environments. A global temporary database is created via the existing create temporary database command. The global temporary database status of a database is indicated by value 0x40000000 (1073741824 decimal) in the "status3" field of a sysdatabases entry. This gets set during the creation of a temporary database. The instanceid column in sysdatabases for a global temporary database is NULL since it is never owned by any node. (The same is true for regular user databases).

E. sp_tempdb: The Binding Interface sp_tempdb is the existing stored procedure that is used to create temporary database groups, bind temporary databases to one or more groups, and bind users and applications to temporary database groups or specific temporary databases. These bindings are stored in the sysattributes table in master database.

sp_tempdb is enhanced so that it can be used for both the SMP and SDC environments. All commands will apply to both SDC and SMP environments, though in some cases involving SDC versions it may take additional arguments.

Note that in SDC, sp_tempdb strictly deals with local temporary databases only and never global temporary databases.

The present invention provides support for tempdb groups functionality as specified in the original multiple tempdb functional specification. This is available in both the SMP and SDC ASE versions. Any existing checks/restraints that prevented this in the sp_tempdb interface are now removed. It is envisioned that users will primarily bind their logins and applications to tempdb groups rather than specific temporary databases. This will allow applications to be agnostic to what actual temporary database they get assigned to since that will change from node to node. However, for purposes of backward compatibility, the ability to bind a login/application to a specific temporary database (in which case the node name will also need to be specified in the binding) is provided.

The changes described in this section are primarily to provide the ability to support node specific bindings. The syntax for sp_tempdb is as follows:
sp_tempdb <operation>
where <operation> is one of help, create, drop, add, remove, bind, unbind, unbindall_db, unbindall_gr, show, who help displays usage information; create and drop manage the creation and drop of temporary database groups; add and remove manage the addition or removal of temporary databases to or from temporary database groups; bind and unbind manage the binding of logins and applications to temporary databases or groups; and unbindall_db removes all login and application bindings for a given database. Also, unbindall_gr removes all login and application bindings for a given group; show displays various information stored in the sysattributes table and who displays all active sessions assigned to a temporary database. The command unbindall_gr is new; all other commands are existing commands. These are enhanced as necessary to support node specific information, as described below. The various operations discussed update the sysattributes table.

Note that all arguments to sp_tempdb have datatype of varchar(30) (nullable). This is mentioned here so as to avoid repetition in the following discussion. Note also that within the context of SDC, only local temporary databases can be bound to and added to groups. Global temporary databases are never involved, and this section strictly deals with local temporary databases even when it is not explicitly stated. Trying to add global temporary databases to a group or binding an application/login to a global temporary database will result in error messages being reported.

Create and Drop

Operation "create" allows the creation of a new temporary database group. Operation "drop" drops a group. These are existing commands, and the external interface remains unchanged. The change in behavior is described below.

The default group is the system-generated group. The limitation where additional groups could not be created is now removed. In SMP the system tempdb was always a member of the default group. However, in SDC, the system tempdb is no longer used for nonshareable temporary objects and hence it will never be part of any temporary database group. In SDC each node has its own default local temporary database (its local system temporary database), and it is this database that will serve the purpose of the always-available temporary database role, which the system tempdb had served in SMP.

As a change from SMP, the default local temporary database assigned to a node will not be automatically part of the default group. This is in line with customer preference (who do not want the system tempdbs to play a role in the round-robin assignments from the default group). But as in SMP, it will serve as the failsafe temporary database. Note that a group is only represented by internal in-memory structures, and other than its definition and its member database information in sysattributes, has no other persistent representation. Each node in a cluster has its own default group as well as any other groups that have been defined, and the corresponding member local temporary databases (as defined in sysattributes).

Add and Remove

Operations "add" and "remove" are existing commands in SMP. Operation "add" adds a temporary database to a group. Operation "remove" removes a temporary database from a group. In SDC the syntax does not change. It continues to be the same as before.

Syntax
sp_tempdb "add", <tempdb name>, <groupname>
sp_tempdb "remove", <tempdb name>, <groupname>

In SDC temporary database to group memberships are node specific (since local temporary databases are owned by specific nodes). The existing syntax for the commands does not change. However, a node id is also stored in sysattributes. The node id is determined by ASE from the sysdatabases entry for the temporary database being added to the group. In SDC, <tempdb name> can only be a local temporary database. It can neither be a global temporary database nor a local system temporary database.

Bind and Unbind

Operation "bind" binds a login and/or application to a temporary database group or to a temporary database. Operation "unbind" removes such a binding. These are existing operations in SMP. They continue to be used in SDC and the syntax changes to take an additional parameter, <instance_name>, for the unbind command.

Note that a login or application can either be bound to a specific temporary database or a group, but not to both. This continues to be true. For purposes of backward compatibility, binding of an application or login is allowed to a specific temporary database (though with support of multiple tempdb groups, this should not be necessary and the group binding should ideally be exclusively used).

Since binding of a login/application is allowed to a specific temporary database and since these (local) temporary databases are node specific, the system supports multiple entries for login/application to temporary database bindings, one for each node. A node id is stored in the sysattributes row for such bindings. This is different from SMP where only one such entry could exist in sysattributes. Note again that in this section 'temporary databases' refers to only local temporary databases. Global temporary databases cannot be bound to and any attempt to do so will result in an error message.

Syntax

The changed syntax is in bold.
sp_tempdb "bind", <object_type>, <obj_name>, <bind_type>, <bind_obj>[, <scope>, <hardness>]
sp_tempdb "unbind", <object_type>, <obj_name>[, <scope>, <instance name>]

<object_type> can be one of "LG" (login type) or "AP" (application) type. <bind_type> can be either "GR" (group), or "DB" (database).

If <object_type> is "LG", then <obj_name> is a login name, and <scope> should be an application name. If <object_type> is "AP", then <object_name> is an application name, and <scope> should be a login name. If <bind_type> is "GR" then <bind_obj> is the name of the group that is being bound to. If <bind_type> is "DB" then <bind_obj> is the name of the physical database that is being bound to. <hardness> can be one of "soft" or "hard" or NULL. A binding that is "hard" implies that a failure to assign a temporary database according to the binding will result in a failure of the login. On the other hand, in the case of a "soft" binding such a failure will always result in the assignment of an alternate temporary database (e.g., one from the default group, or failing that, the default local temporary database for the host node). The default is "soft". <scope> can be NULL. <instance_name> is a new parameter introduced for SDC support. It is the name of a node in SDC. It can be NULL. Note that "LG" and "login_name", "AP" and "application_name", "GR" and "group", "DB" and "database" (including their uppercase and lowercase forms). For the clarity of discussion, the shorter forms of these arguments are used. In the following description it is assumed that only the SDC case is being described. The SMP case remains unchanged, and SMP specific usage is not discussed here.

Bind

For this to succeed, the following must hold:

<bind_type> must be one of "GR" or "DB"

if <bind_type> is "GR" then <bind_obj> must be a name of an existing group.

if <bind_type> is "DB" then <bind_obj> must be an existing local temporary database name.

<object_type> must be one of "AP" or "LG"

if <object_type> is "LG" then <obj_name> must be a valid login name.

<scope> can be NULL. If it is not NULL, and <obj_type> is "AP", then <scope> must be a valid login name (otherwise it is assumed to be an application name).

<hardness> can be NULL. If it is not NULL then it must be either "hard" or "soft".

If any of these is not true then sp_tempdb will fail, otherwise a new entry is inserted into sysattributes to represent this binding. Note that for a given triplet (<obj_name>, <obj_type>, <scope>), there can be either a "GR" or "DB"<bind_type> entry in sysattributes, but never both. Furthermore, only one entry of "GR"<bind_type> for the triplet is possible whereas separate "DB" entries (one for each node in a cluster) are allowed in a SDC.

Note that when creating a "DB"<bind_type> binding in SDC, the user is not required to explicitly provide a <instance_name>. Since the local temporary database being bound to is owned by one and only one node in SDC, the system can internally determine the node for which the binding is being created. The node id for that node is recorded in the sysattributes entry for this binding.

If a "GR"<bind_type> entry already exists for (<obj_name>, <obj_type>, <scope>) triplet, and the new entry is also for "GR"<bind_type>, then that entry will get updated with the new information represented by <bind_type> and <bind_obj>. If, however, the new <bind_type> is "DB", then an error will be reported and the user will be first required to remove the existing "GR" binding. This is different from SMP behavior where a new binding would simply overwrite an existing binding.

Similarly, if a "DB"<bind_type> entry already exists for (<obj_name>, <obj_type>, <scope>) triplet (for the specific node which is the owner of the local temporary database being bound to), and the new entry is also for "DB"<bind_type> then the existing entry will be updated. If, however, the new entry if for "GR"<bind_type> and there exists one or more "DB" entries for the triplet, an error would be reported and the user would first need to drop the "DB" binding(s). This is different from SMP behavior. Since multiple "DB" bindings might exist, one should not presume that user wants to delete all of these and replace these with the single "GR" binding. Hence, it is required that the user first explicitly drop any existing bindings and then create the new ones.

This operation does not affect any ASE internal representation. The new binding created will be in effect immediately, but does not change the current temporary database assignment of already active sessions. This means that any session that has already been assigned a temporary database before the new binding came into affect will continue to maintain that original assignment. Only new sessions will be affected by the new binding.

Note that the scope of these bindings is cluster wide. All nodes will take these bindings into consideration when assigning a local temporary database to an incoming session. In the case of a "GR" binding, the actual local temporary database assigned to a session will depend on what local temporary databases are member of the group on the host node (since these will be different from node to node). Note that applications can change their name through the ct_lib interface (and other interfaces such as jConnect) even after connecting and instantiating a session. As mentioned before, this will not affect the temporary database assignment to the session. This also holds true for the command setuser which allows a database owner to impersonate another user.

Example sp_tempdb "bind", "lg", "sa", "GR", "default"

This binds login sa to the default group.

sp_tempdb "bind", "lg", "sa", "DB", "localdbname1_node1"

This will report an error, since "sa" is already bound to a group. The user will be first required to drop the existing binding before re-attempting to create the "DB" binding.

sp_tempdb "bind", "ap", "isql", "DB", "localdbname1_node1"

This binds the isql (interactive SQL) application to the localdbname_node1 database.

sp_tempdb "bind", "ap", "isql", "DB", "localdbname2_node1"

Assuming that both localdbname2_node1 and localdbname1_node1 are both owned by node1, then this updates the previous "DB" binding to now bind the isql to localdbname2_node1.

sp_tempdb "bind", "ap", "isql", "DB", "localdbname1_node2"

Assuming that localdbname1_node2 is owned by node 2, then this creates a new "DB" binding for isql that is applicable for node 2 only. The previous binding for node1 remains.

sp_tempdb "bind", "ap", "isql", "GR", "default"

This will report an error since one or more bindings of "DB" type already exist for "isql". The user would be first required to drop these existing bindings before re-attempting to create the "GR" binding. Note that, as mentioned before, in the above examples "lg" can be replaced with "LG", "login_name" or "LOGIN_NAME". Similarly "ap", "GR" and "DB" can be replaced with their full form versions.

Unbind

This command is updated in SDC to accept a new parameter <instance_name>. Since, for a given login/application multiple bindings of <bind_type>"DB" are possible in SDC, the user will need to indicate which "DB" binding needs to be removed. For this to succeed, the following must hold:

<obj_type> must be one of "AP" or "LG"

if <obj_type> is "LG" then <obj_name> must be a valid login name.

<scope> can be NULL. If it is not NULL, and <obj_type> is "AP", then <scope> must be a valid login name (otherwise it is assumed to be an application name).

The <instance_name> may be NULL. It is only relevant when the user wants to drop a specific binding of <bind_type>"DB". If it is not provided, all qualifying "DB" bindings will be dropped. If there is a "GR" binding (and there can only be one) it will be dropped. If <instance_name> is provided, and there is a "GR" binding, then the <instance_name> will be ignored. If there are "DB" bindings, then only the one (if it exists) relevant "DB" binding (the one for <instance_name>) will be dropped.

If any of these is not true then the operation will fail; otherwise corresponding entry in sysattributes will be deleted. This operation has no affect on the ASE in-memory representation. Example:

sp_tempdb "unbind", "lg", "sa"

This command will remove any/all bindings for login sa.

sp_tempdb "unbind", "ap", "isql"

This command will remove any/all bindings for application isql.

sp_tempdb "unbind", "ap", "isql", "node1"

This command will either remove any "GR" binding for isql (if there is a "GR" binding), or will remove a "DB" binding for isql for a local temporary database owned by node1. In the latter case, any other "DB" bindings for isql (for nodes other than node1) will continue to exist. Note that, as mentioned before, in the above examples "lg" can be replaced with "LG", "login_name" or "LOGIN_NAME". Similarly "ap" can be replaced with its full form versions.

unbindall_db

Operation "unbindall_db" is used to remove all bindings for a given temporary database in SMP. In SDC it continues to remain the same as before.

unbindall_gr

Operation unbindall_gr is used to remove all bindings application and login bindings to a given group in SMP and SDC. It does not remove any database to group bindings. It is a new command, with the syntax:

sp_tempdb "unbindall_gr", <groupname>

<groupname> must be provided else it is an error. Existing assignments to active sessions are not affected by this operation; for example:

sp_tempdb "unbindall_gr", "tempdbgroup1"

Show

Operation "show" is used to display information about the existing groups, group members, login and application bindings, as well as active sessions that are assigned to a given database. It is an existing command and syntax and semantics remain unchanged from SMP.

Who

Operation who displays all active sessions that are assigned to a temporary database. The syntax is:

sp_tempdb "who", <dbname>

<dbname> is the name of a local temporary database, and needs to be provided for this command to succeed. If a non-temporary database name is provided the command will execute but should not report any active sessions bound to it. For example:

```
> sp_tempdb "who", "localtempdb1"
spid loginame
------ ------------------------------
2 NULL
3 NULL
```

```
4 NULL
5 NULL
6 NULL
7 NULL
8 NULL
> sp_tempdb "who", "localtempdb2"
spid loginame
------ ------------------------------
17 sa
```

Help

Operation "help" displays usage information for the sp_tempdb interface. The information displayed will vary depending on whether the command is executed from a SDC or SMP environment. Only the information relevant to the active environment will be displayed. The syntax is:

sp_tempdb "help"

Executing sp_tempdb without specifying a command is equivalent to executing sp_tempdb "help".

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Setup of Local System Temporary Databases

Figure 7:
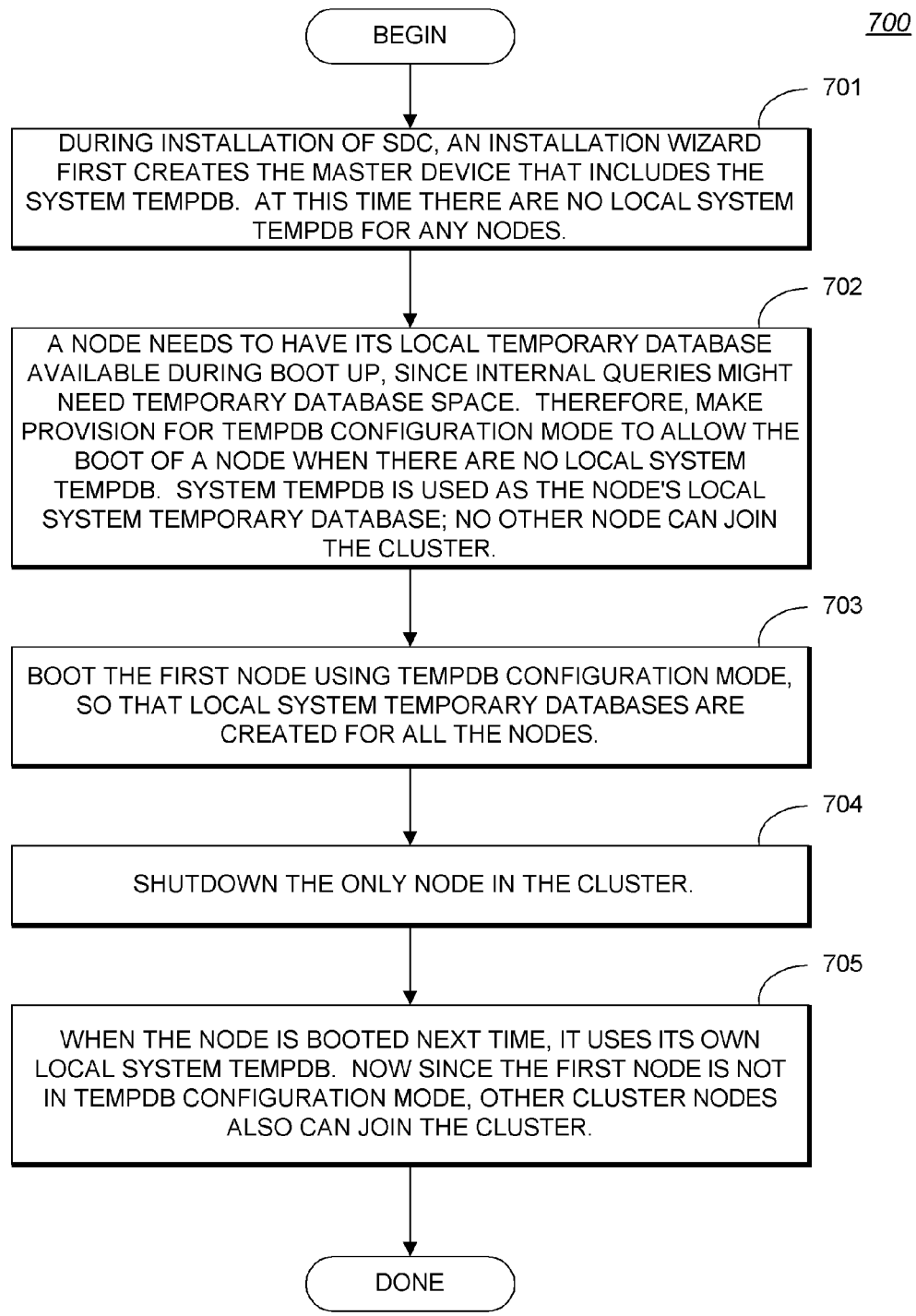
FIG. 7 is a flowchart illustrating a method for setting up local system temporary databases.

FIG. 7 is a flowchart illustrating a method 700 for setting up local system temporary databases. During installation of SDC, an installation wizard first creates the master (main) device that includes the system tempdb, as indicated at step 701. At this time there are no local system tempdb for any nodes. A node needs to have its local temporary database available during boot up, since internal queries might need temporary database space. Therefore, at step 702, the method makes provision for tempdb configuration mode to allow the boot of a node when there are no local system tempdbs. In this mode, system tempdb is used as the node's local system temporary database. However, when the cluster is in tempdb configuration mode, no other node can join the cluster. Note that this tempdb configuration mode is automatic. By booting the first node using tempdb configuration mode, local system temporary databases are created for all the nodes, as shown at step 703. At step 704, the only node in the cluster is shutdown. When the node is booted next time, at step 705, it uses its own local system tempdb. Now since the first node is not in tempdb configuration mode, other cluster nodes also can join the cluster, if a local system tempdb exists for them. Note that local system temporary databases are always created on the shared storage so that one node can create these for other nodes as well.

Figure 8:
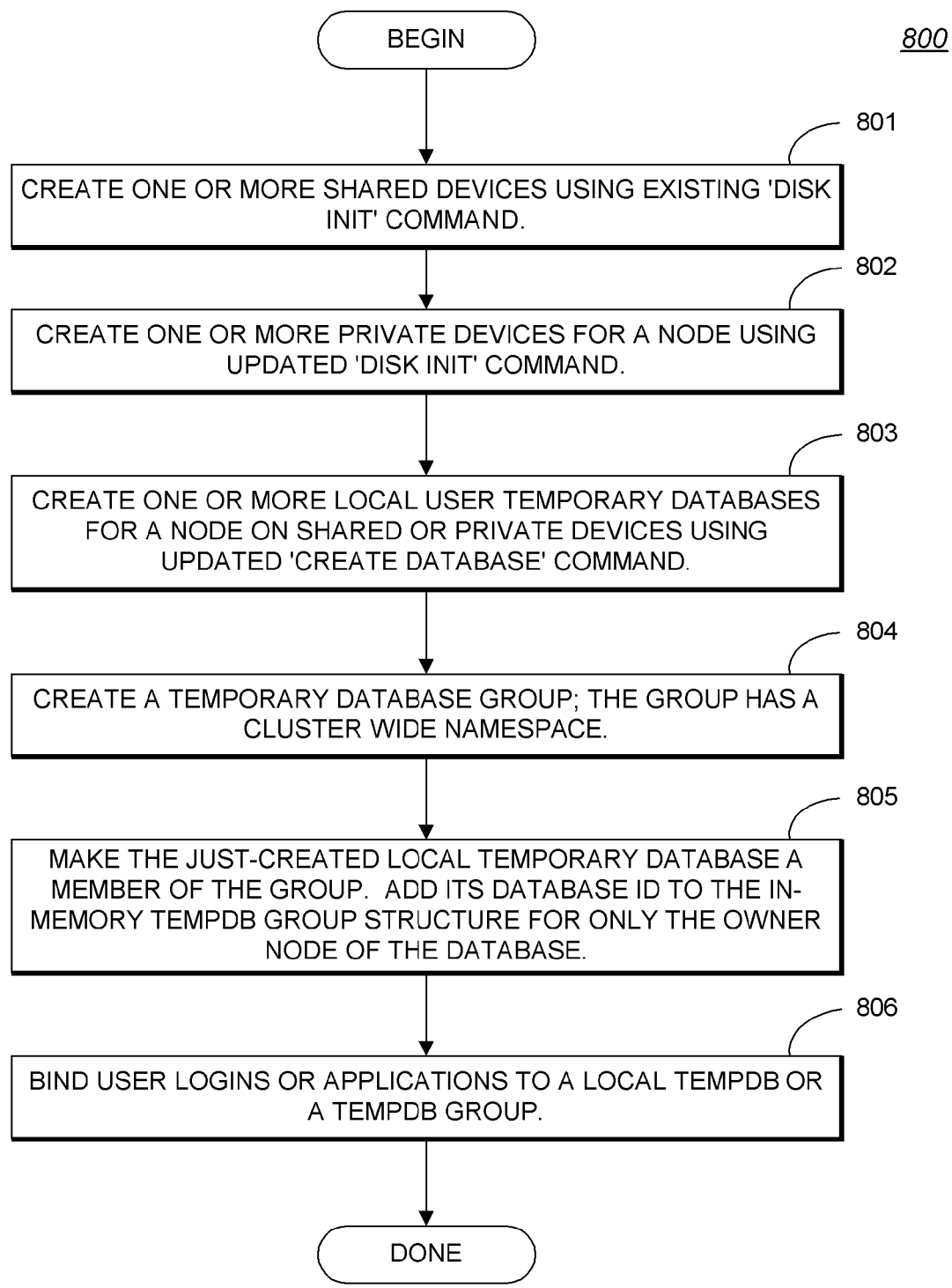
FIG. 8 is a flowchart illustrating a method of the present invention for creating private devices, local user temporary databases, and a temporary database group.

Creating Private Devices, Local User Temporary Databases, and a Temporary Database Group FIG. 8 is a flowchart illustrating a method 800 of the present invention for creating private devices, local user temporary databases, and a temporary database group. At step 801, one or more shared devices are created using the existing 'DISK INIT' command. At step 802, one or more private devices for a node are created by using the updated 'DISK INIT' command. Though private devices could be created on shared storage, their most common use is for RAM-Disks. One or more local user temporary databases are now created for a node on shared or private devices using updated 'CRE- ATE DATABASE' command, at step 803. Next, at step 804, a temporary database group is created. A temporary database group has a cluster wide namespace. When a group is created, the in-memory structures that represent the temporary database group are allocated on all the nodes.

The just-created local temporary database is made a member of the group, at step 805. When a local temporary database is made a member of the tempdb group, its database id is added to the in-memory tempdb group structure for only the owner node of the database. It has no effect on the in-memory structure for the same tempdb group on other cluster nodes. (If the owner node is not running, no in-memory changes are made whatsoever.) In this manner, though the tempdb group is a cluster wide entity, it has different local temporary databases as its members (on each node). User logins or applications may now be bound to a local tempdb or a tempdb group, as indicated at step 806. A login or an application can be either bound to (1) a temporary database group or (2) local temporary databases (at most one from each node).

Assignment of Tempdb to a Session

Figure 9:
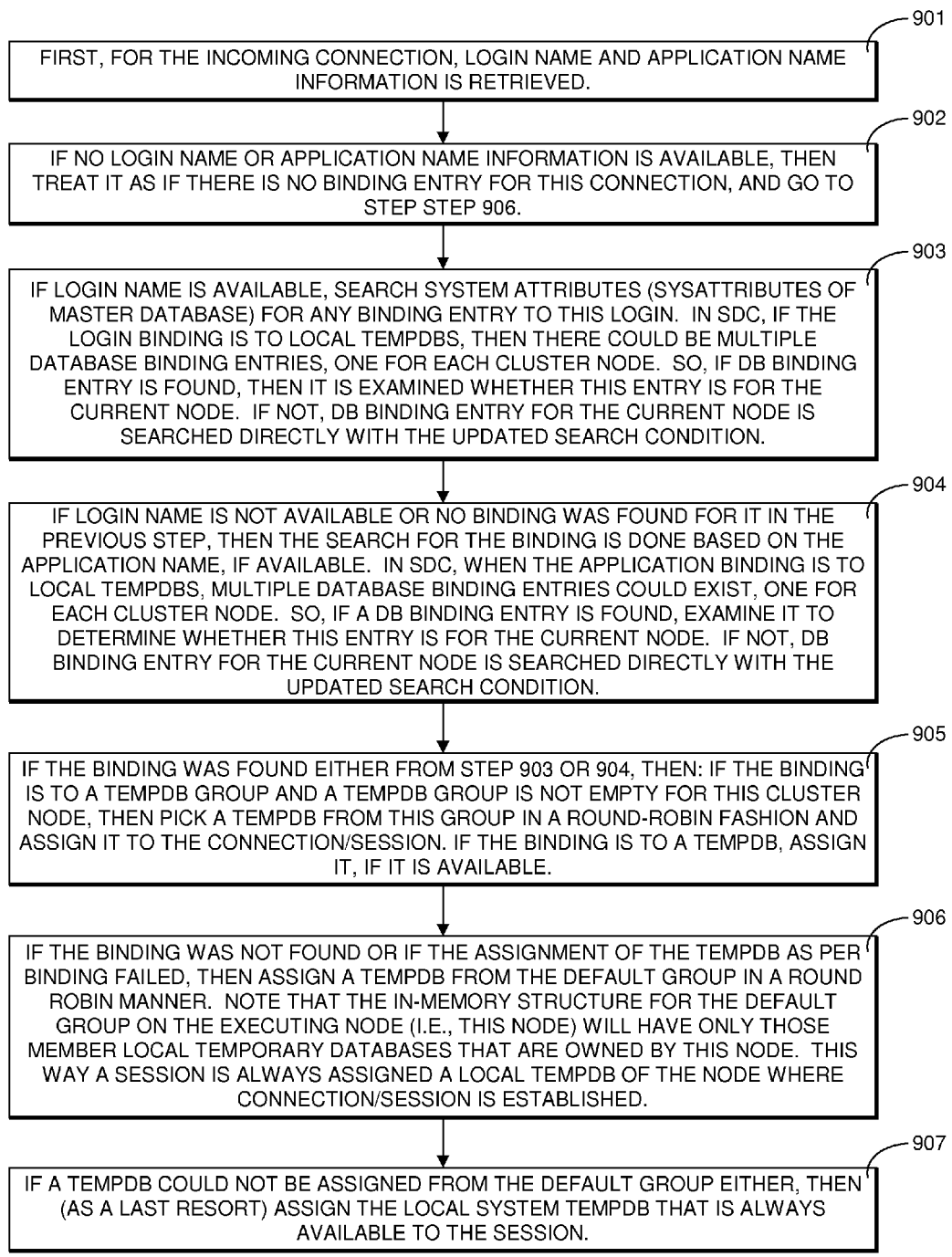
FIG. 9 is a diagram of pseudocode illustrating a method of the present invention for assignment of a temporary database (tempdb) to a session.

At the time of establishing a connection/session to a cluster node, the database server assigns a local temporary database. FIG. 9 is a diagram of pseudocode illustrating a method 900 of the present invention for assignment of a tempdb to a session. The following method steps are followed:

Step 901: First, for the incoming connection, login name and application name information is retrieved.

Step 902: If no login name or application name information is available, then treat it as if there is no binding entry for this connection, and go to step Step 906.

Step 903: If login name is available, search system attributes (sysattributes of master database) for any binding entry to this login. In SDC, if the login binding is to local tempdbs, then there could be multiple database binding entries, one for each cluster node. So, if DB binding entry is found, then it is examined whether this entry is for the current node. If not, DB binding entry for the current node is searched directly with the updated search condition.

Step 904: If login name is not available or no binding was found for it in the previous step, then the search for the binding is done based on the application name, if available. In SDC, when the application binding is to local tempdbs, multiple database binding entries could exist, one for each cluster node. So, if a DB binding entry is found, examine it to determine whether this entry is for the current node. If not, DB binding entry for the current node is searched directly with the updated search condition.

Step 905: If the binding was found either from step 903 or 904, then:

If the binding is to a tempdb group and a tempdb group is not empty for this cluster node, then pick a tempdb from this group in a round-robin fashion and assign it to the connection/session.

If the binding is to a tempdb, assign it, if it is available.

Step 906: If the binding was not found or if the assignment of the tempdb as per binding failed, then assign a tempdb from the default group in a round robin manner. Note that the in-memory structure for the default group on the executing node (i.e., this node) will have only those member local temporary databases that are owned by this node. This way a session is always assigned a local tempdb of the node where connection/session is established.

Step 907: If a tempdb could not be assigned from the default group either, then (as a last resort) assign the local system tempdb that is always available.

Recovery Semantics of Local and Global Temporary Databases

Figure 10A:
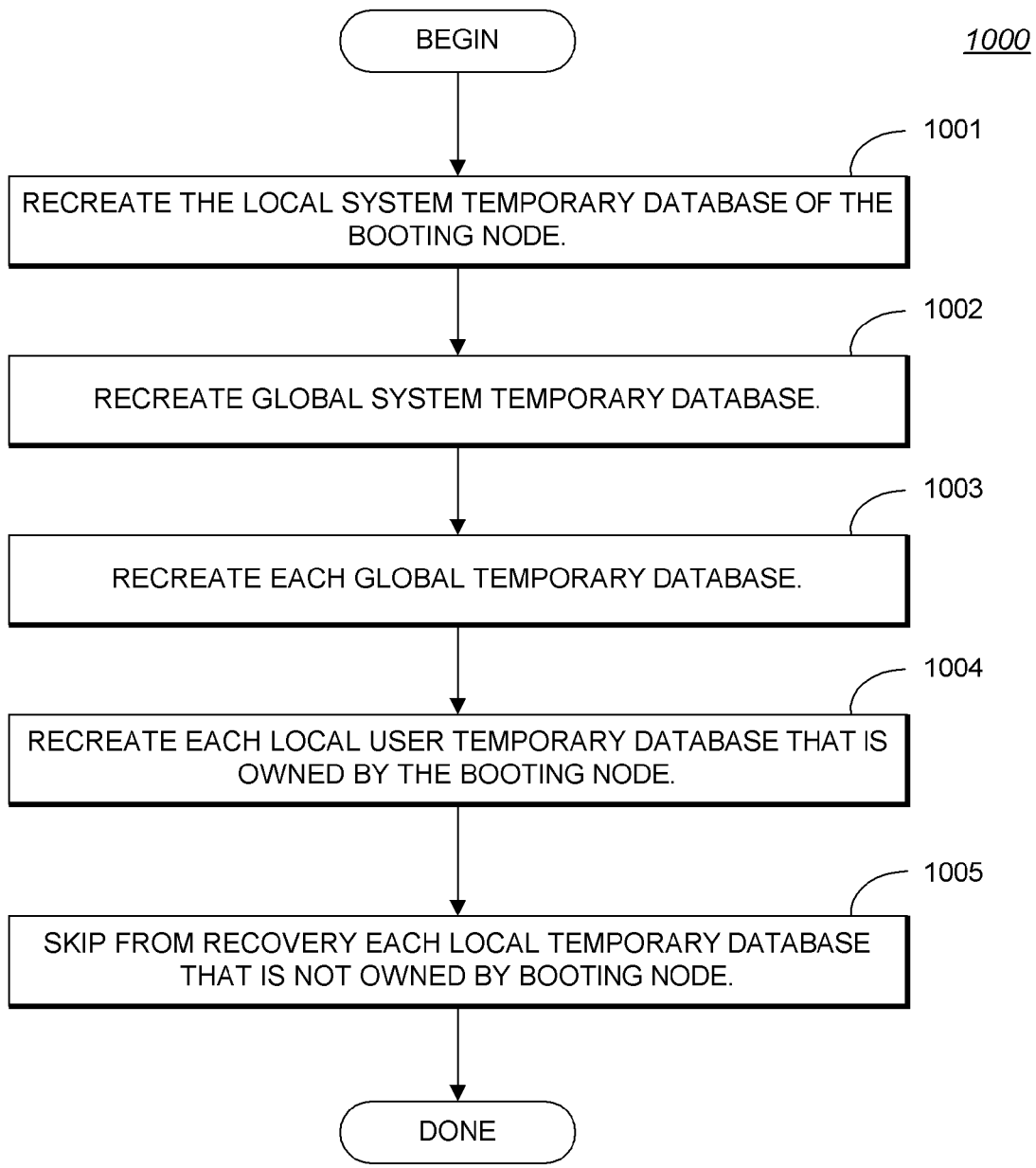
FIGS. 10A-C are diagrams illustrating methodology of the present invention for implementing cluster boot recovery, cluster failover recovery, and node joining methodologies of the present invention.
Figure 10B:
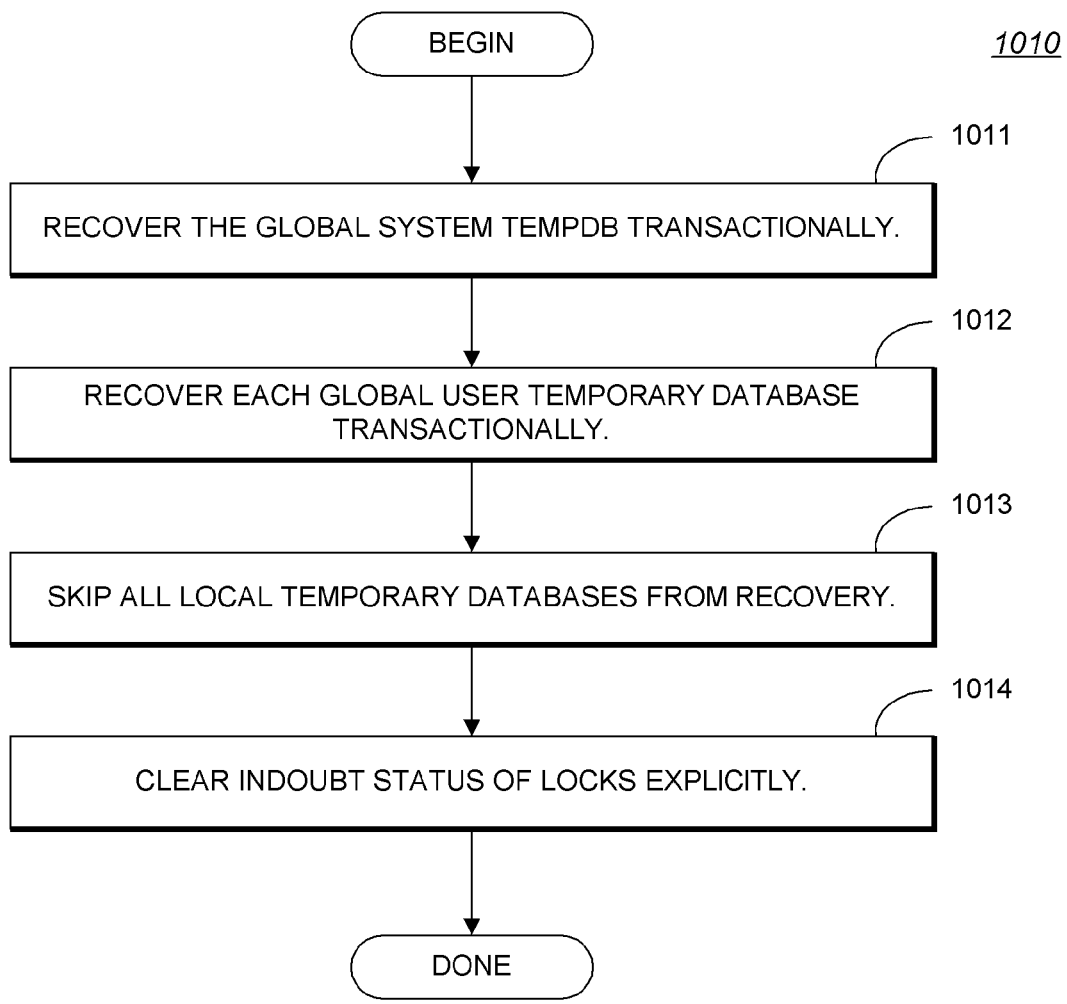
Figure 10C:
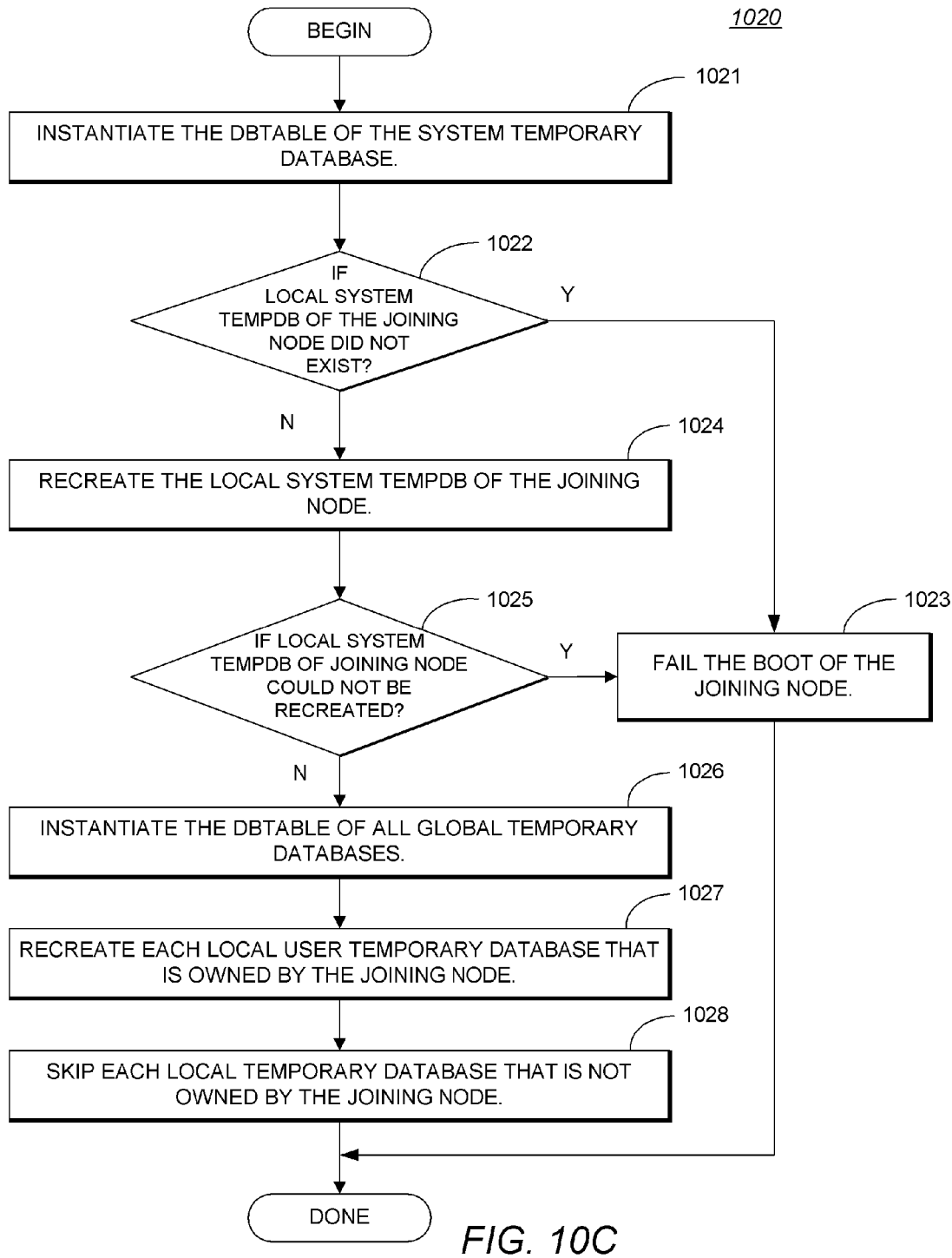

FIGS. 10A-C are diagrams illustrating methodology of the present invention for implementing recovery semantics of local and global temporary databases. FIG. 10A is a flowchart illustrating cluster boot recovery methodology 1000; the method steps are as follows. At step 1001, the local system temporary database of the booting node is recreated. Next, at step 1002, the global system temporary database is recreated. At step 1003, each global temporary database is recreated. Each local temporary database that is owned by the booting node is recreated, at step 1004. Finally, at step 1005, each local temporary database that is not owned by a booting node is skipped from recovery. These steps only describe the actions that are taken on each type of temporary database during cluster boot recovery and does not necessarily indicate the order in which these steps are executed.

FIG. 10B is a flowchart illustrating cluster failover recovery methodology 1010. The method steps proceed as follows. At step 1011, the global system tempdb is transactionally recovered. Next, at step 1012, each global user temporary database is transactionally recovered. All local temporary databases are skipped from recovery, as indicated by step 1013. This is because no shared data is created in any local temporary database. So, if a local tempdb belonged to the failed node, for example, it does not need to be recovered (as other cluster nodes would not have any data stored in it). Similarly, if a local tempdb is owned by any of the surviving nodes, it still does not need to be recovered, as the failed node would not have created any data into it. Finally, step 1014 the INDOUBT status of locks is cleared explicitly. A local tempdb is used only by its owner node. However, due to the distributed nature of cluster lock management, other non-owner cluster nodes also participate in management of its locks. So, when a cluster node crashes, it may render some of the locks of a local tempdb (both owned by failed node as well as owned by other node) in INDOUBT status. Normally, INDOUBT status of all locks of a database is cleared upon the recovery of the database. Accordingly, although local tempdbs are skipped for recovery, the INDOUBT status of their locks is cleared explicitly. These steps only describe the actions that are taken on each type of temporary database during cluster boot recovery and does not necessarily indicate the order in which these steps are executed.

FIG. 10C is a flowchart illustrating a node join methodology 1020 of the present invention. At step 1021, the dbtable of the system temporary database is instantiated. If the local system tempdb of the joining node does not exist, tested at step 1022, then the method fails the boot of the joining node by proceeding to step 1023. Otherwise, at step 1024, the local system tempdb of the joining node is recreated. If the local system tempdb of the joining node could not be recreated, tested at step 1025, then the method fails the boot of the joining node by proceeding to step 1023. Otherwise, if the local system table of the joining node can be recreated, the dbtable of all global temporary databases is instantiated at step 1026. At step 1027, each local user temporary database that is owned by the joining node is recreated. Each local temporary database that is not owned by the joining node is skipped as indicated at step 1028.

Rules observed for instantiation of the dbtable are as follows:

1. The dbtable of a local temporary database can be instantiated at one and only one node at any given time.
2. The dbtable of a local user temporary database cannot be instantiated at other nodes.
3. The dbtable of a local system temporary database cannot be instantiated at other nodes except when it is being created or dropped from (some) other nodes.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a high performance transactional database system, an improved method for managing temporary data, the method comprising:
    establishing a shared disk cluster (SDC) database system comprising a plurality of computer systems (nodes) clustered together to function as a single system that manages a single shared database disk image stored on a common collection of disks that is shared among the nodes (shared storage), wherein temporary data is utilized by one or more sessions on one or more nodes of the shared disk cluster for storing intermediate results of query processing, procedural processing, or application processing;
    dividing temporary data into two types by:
    designating temporary data that is restricted to local use by a database session of a node to be private temporary data; and
    designating temporary data that is shared among multiple database sessions on one or more nodes to be global temporary data;
    storing the temporary data by:
    for temporary data designated as global temporary data, creating a global temporary database on the shared storage, said global temporary database comprising a temporary database accessible to all nodes of the shared disk cluster, said global temporary database employing write ahead logging so that changes to said global temporary database are recovered upon failure of a node;
    for temporary data designated as private temporary data, creating a local temporary database accessible to only a single node (owner node) of the shared disk cluster, said local temporary database not employing write ahead logging so that changes to said local temporary database are lost upon failure of the owner node;
    binding an application to the local temporary database on the owner node for providing the application with local temporary storage when the application is connected to the owner node; and
    storing temporary data used by the application in the local temporary database without requiring use of write ahead logging for transactional recovery of the temporary data used by the application, wherein the temporary data used by the application is discarded when the application is no longer connected to the owner node.

2. The method of claim 1, further comprising:
    binding a database login to the local temporary database on the owner node for local temporary storage; and
    storing temporary data used by the database login in the local temporary database when connected to the owner node without requiring use of write ahead logging for transactional recovery of said temporary data.

3. The method of claim 1, wherein said step of creating a local temporary database includes creating the local temporary database on a private device.

4. The method of claim 3, wherein said step of creating the local temporary database on a private device includes using an attribute to indicate that only the owner node has access to the private device.

5. The method of claim 3, wherein said private device comprises a solid state storage disk using random-access memory.

6. The method of claim 1, wherein the local temporary database is created on a shared device with access restricted to a single node.

7. The method of claim 1, wherein said storing temporary data step includes storing temporary data in the local temporary database on the owner node without requiring synchronization with other nodes of the cluster.

8. The method of claim 1, wherein said storing temporary data step includes storing temporary data in the local temporary database on the owner node without requiring transfer of pages among nodes of the cluster.

9. The method of claim 1, wherein storing temporary data step includes storing temporary data in the local temporary database without use of a cluster wide lock for protecting access to said temporary data from other nodes in the cluster.

10. The method of claim 1, further comprising:
    upon failure of a node, transactionally recovering changes made in the global temporary database.

11. The method of claim 1, further comprising:
    upon failure of the owner node, discarding changes made in the local temporary database.

12. The method of claim 1, further comprising:
    creating one local system temporary database for each node of the cluster.

13. The method of claim 12, wherein a local system temporary database at a given node of the cluster serves as a default local temporary database for such node.

14. The method of claim 1, further comprising:
    in response to user input, creating a plurality of local temporary databases at the owner node.

15. The method of claim 14, wherein said binding an application step includes binding an application to a local temporary database selected by the user from the plurality of local temporary databases at the owner node.

16. The method of claim 14, further comprising:
    creating a temporary database group; and
    adding a local temporary database as a member of the temporary database group.

17. The method of claim 16, wherein said binding an application step includes binding an application to the temporary database group.

18. The method of claim 16, further comprising:
    binding a database login to the temporary database group for local temporary storage; and
    storing temporary data used by the database login in a member local temporary database of the temporary database group when connected to the owner node, without requiring use of write ahead logging for transactional recovery of said temporary data.

19. The method of claim 1, further comprising:
    downloading a set of processor-executable instructions from a Web server for performing the method of claim 1 at said shared disk cluster database system.

20. A database system providing improved management of temporary data, the system comprising:
    a shared disk cluster (SDC) database system comprising a plurality of computer systems (nodes) clustered together to function as a single system that manages a single shared database disk image stored on a common collection of disks that is shared among the nodes (shared storage), wherein temporary data is utilized by one or more sessions of one or more nodes of the shared disk cluster for storing intermediate results of query processing, procedural processing, or application processing;

a global temporary database on shared storage, said global temporary database comprising a temporary database accessible to all nodes of the cluster for storing temporary data that is shared among multiple database sessions on one or more given nodes;

a local temporary database accessible to only a single node (owner node) of the cluster and providing storage for temporary data that is restricted to local use by a database session of a given owner node;

a module operable to provide failure recovery for said global temporary database without providing failure recovery for said local temporary database, so that changes to said global temporary database may be transactionally recovered upon failure of a node; and an application which is bound to the local temporary database and when connected to the owner node uses the local temporary database for storing temporary data without use of write ahead logging for transactional recovery of the temporary data used by the application, wherein the temporary data is discarded when the application is no longer bound to the local temporary database.

21. The system of claim 20, further comprising:
a database login which is bound to the local temporary database and when connected to the owner node uses the local temporary database for storing temporary data without use of write ahead logging for transactional recovery of said temporary data.

22. The system of claim 20, wherein said local temporary database is created on a private device.

23. The system of claim 22, wherein said local temporary database is created on a private device using an attribute to indicate that only the owner node has access to the private device.

24. The system of claim 22, wherein said private device comprises a solid state storage disk using random-access memory.

25. The system of claim 20, wherein said local temporary database is created on a shared device with access restricted to a single node.

26. The system of claim 20, wherein temporary data is stored in the local temporary database on the owner node without requiring synchronization with other nodes of the cluster.

27. The system of claim 20, wherein temporary data is stored in the local temporary database on the owner node without requiring transfer of pages among nodes of the cluster.

28. The system of claim 20, wherein temporary data is stored in the local temporary database without protecting said temporary data with a cluster wide lock.

29. The system of claim 20, wherein said module operable to provide failure recovery transactionally recovers changes made in the global temporary database upon failure of a node.

30. The system of claim 29, wherein said module operable to provide failure recovery discards changes made in the local temporary database upon failure of the owner node.

31. The system of claim 20, further comprising:
a local system temporary database at each node of the cluster.

32. The system of claim 31, wherein a local system temporary database at a given node of the cluster serves as a default local temporary database for such node.

33. The system of claim 20, further comprising: a plurality of additional local temporary databases at the owner node.

34. The system of claim 33, wherein the application is bound to a given local temporary database selected by a user from the plurality of local temporary databases available at the owner node.

35. The system of claim 33, wherein a database login is bound to a given local temporary database selected by a user from the plurality of local temporary databases available at the owner node.

36. The system of claim 35, wherein the database login uses the local temporary database for storing temporary data when connected to the owner node without use of write ahead logging for transactional recovery of said temporary data.

37. The system of claim 33, further comprising:
a temporary database group including a local temporary database as a member.

38. The system of claim 37, wherein the application is bound to the temporary database group for local temporary storage.

39. The system of claim 37, further comprising:
a database login bound to the temporary database group for local temporary storage; wherein the database login stores temporary data in a member local temporary database of the temporary database group when connected to the owner node without requiring use of write ahead logging for transactional recovery of said temporary data.

40. A non-transitory computer readable medium encoded with a computer program, the program comprising instructions that when executed by one or more processors cause the one or more processors to perform operations comprising:

establishing a shared disk cluster (SDC) database system comprising a plurality of computer systems (nodes) clustered together to function as a single system that manages a single shared database disk image stored on a common collection of disks that is shared among the nodes (shared storage), wherein temporary data is utilized by one or more sessions on one or more nodes of the shared disk cluster for storing intermediate results of query processing, procedural processing, or application processing;

dividing temporary data into two types by:
designating temporary data that is restricted to local use by a database session of a node to be private temporary data; and
designating temporary data that is shared among multiple database sessions on one or more nodes to be global temporary data;

storing the temporary data by:
for temporary data designated as global temporary data, creating a global temporary database on the shared storage, said global temporary database comprising a temporary database accessible to all nodes of the shared disk cluster, said global temporary database employing write ahead logging so that changes to said global temporary database are recovered upon failure of a node;

for temporary data designated as private temporary data, creating a local temporary database accessible to only a single node (owner node) of the shared disk cluster, said local temporary database not employing write ahead logging so that changes to said local temporary database are lost upon failure of the owner node;

binding an application to the local temporary database on the owner node for providing the application with local temporary storage when the application is connected to the owner node; and storing temporary data used by the application in the local temporary database without requiring use of write ahead logging for transactional recovery of the temporary data used by the application, wherein the temporary data used by the application is discarded when the application is no longer connected to the owner node.

* * * * *